United States Patent
Dove et al.

(10) Patent No.: US 12,025,226 B2
(45) Date of Patent: Jul. 2, 2024

(54) SEALING ELEMENT AND METHOD OF MANUFACTURE OF A SEALING ELEMENT

(71) Applicant: W. L. Gore & Associates, Inc., Newark, DE (US)

(72) Inventors: Kevin E. Dove, Wilmington, DE (US); Steve E. Minor, Elkton, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 323 days.

(21) Appl. No.: 17/295,680

(22) PCT Filed: Nov. 19, 2019

(86) PCT No.: PCT/US2019/062256
§ 371 (c)(1),
(2) Date: May 20, 2021

(87) PCT Pub. No.: WO2020/106745
PCT Pub. Date: May 28, 2020

(65) Prior Publication Data
US 2022/0018437 A1    Jan. 20, 2022

Related U.S. Application Data

(60) Provisional application No. 62/770,307, filed on Nov. 21, 2018.

(51) Int. Cl.
*F16J 15/10* (2006.01)
*B32B 25/08* (2006.01)
(Continued)

(52) U.S. Cl.
CPC .............. *F16J 15/102* (2013.01); *B32B 25/08* (2013.01); *B29C 45/14* (2013.01);
(Continued)

(58) Field of Classification Search
CPC .......... F16J 15/10; F16J 15/102; F16J 15/108; B32B 25/08; B32B 2264/10;
(Continued)

(56) References Cited

U.S. PATENT DOCUMENTS 3,002,770 A   10/1961   Chesnut et al.
3,315,020 A    4/1967   Gore
(Continued)

FOREIGN PATENT DOCUMENTS

DE    19839502 A1    3/2000
EP     1298178 A1    4/2003
(Continued)

OTHER PUBLICATIONS

International Search Report and Written Opinion received for PCT Patent Application No. PCT/US2019/062256, dated Jan. 22, 2020, 12 pages.

*Primary Examiner* — Gilbert Y Lee
(74) *Attorney, Agent, or Firm* — Faegre Drinker Biddle & Reath

(57) ABSTRACT

Disclosed is a sealing element and a method of manufacture. The sealing element has a sealing surface for providing a seal against a contact surface. A sintered PTFE film is coupled to the elastomeric body, and defines the sealing surface, which is of particular suitability for a dynamic seal. The sealing film comprises a lubricious particulate material.

20 Claims, 12 Drawing Sheets

(51) Int. Cl.
*B29C 45/14* (2006.01)
*B29K 21/00* (2006.01)
*B29K 507/04* (2006.01)
*B29K 627/18* (2006.01)
*B29L 31/26* (2006.01)

(52) U.S. Cl.
CPC .... *B29K 2021/003* (2013.01); *B29K 2507/04* (2013.01); *B29K 2627/18* (2013.01); *B29L 2031/26* (2013.01); *B32B 2264/10* (2013.01); *B32B 2307/732* (2013.01); *B32B 2581/00* (2013.01)

(58) Field of Classification Search
CPC .......... B32B 2307/732; B32B 2581/00; B29C 45/14; B29K 2021/003; B29K 2507/04; B29K 2627/18; B29L 2031/26
See application file for complete search history.

(56) References Cited

U.S. PATENT DOCUMENTS

| | | | |
|---|---|---|---|
| 3,644,916 A | 2/1972 | Payne, Sr. | |
| 4,133,927 A | 1/1979 | Tomoda et al. | |
| 5,141,800 A * | 8/1992 | Effenberger | B29C 66/45 |
| | | | 442/261 |
| 5,431,872 A * | 7/1995 | Sink | F16J 15/3284 |
| | | | 264/161 |
| 5,551,706 A | 9/1996 | Barna et al. | |
| 5,552,100 A | 9/1996 | Shannon et al. | |
| 5,916,671 A | 6/1999 | Dauber et al. | |
| 5,964,465 A | 10/1999 | Mills et al. | |
| 6,089,576 A | 7/2000 | Hollenbaugh et al. | |
| 7,658,387 B2 | 2/2010 | Park | |
| 9,549,829 B2 | 1/2017 | Humphrey et al. | |
| 2003/0012905 A1 | 1/2003 | Zumbrum et al. | |
| 2003/0122318 A1 | 7/2003 | Yanagiguchi et al. | |
| 2005/0202233 A1 | 9/2005 | Dove | |
| 2007/0040338 A1 | 2/2007 | Dove | |
| 2009/0295210 A1 | 12/2009 | Fukuzawa et al. | |
| 2013/0175766 A1 | 7/2013 | Scholz | |
| 2016/0367947 A1 | 12/2016 | Hollenbaugh, Jr. et al. | |
| 2017/0113433 A1 | 4/2017 | Hodgins et al. | |

FOREIGN PATENT DOCUMENTS

| | | | |
|---|---|---|---|
| EP | 2493534 B1 | 4/2017 | |
| EP | 3657051 A1 | 5/2020 | |
| GB | 1592517 A | 7/1981 | |
| JP | 61-026631 A | 2/1986 | |
| JP | 2839366 B2 * | 12/1998 | ............. B29C 65/02 |
| JP | 2000-074223 A | 3/2000 | |
| JP | 2008-273199 A | 11/2008 | |
| JP | 2009-172806 A | 8/2009 | |
| JP | 2022-508142 A | 1/2022 | |
| WO | 97/03812 A1 | 2/1997 | |
| WO | 01/90274 A1 | 11/2001 | |
| WO | 2005/097877 A1 | 10/2005 | |

* cited by examiner

SEALING ELEMENT AND METHOD OF MANUFACTURE OF A SEALING ELEMENT

CROSS-REFERENCE TO RELATED APPLICATION

This application is a national phase application of PCT Application No. PCT/US2019/062256, internationally filed on Nov. 19, 2019, which claims the benefit of U.S. Provisional Application No. 62/770,307, filed Nov. 21, 2018, which are herein incorporated by reference in their entireties for all purposes.

FIELD OF THE INVENTION

The present invention relates to seals, particularly dynamic seals, comprising polytetrafluoroethylene and elastomers, as well as methods of making these.

BACKGROUND TO THE INVENTION

Dynamic seals are often required between moving parts in mechanical systems, for example in pumps, around rotating shafts, valves and the like. Not only must the sealing material be capable of hindering or preventing fluid flow from one side of the seal to the other, but it is also required to do so for a suitable working lifetime, without causing undue wear to the opposing surface(s). Friction losses between moving components are also undesirable in many applications.

In the automotive industry, for example, it is desirable to reduce parasitic energy losses due to friction, to improve vehicle fuel efficiency. This can be particularly challenging where elastomeric dynamic seals are required between moving, or rotating, parts, such as are typically found within the pumps and valves of the cooling system, fuel system and lubrication system, due to the inherently high surface friction of the elastomers used in these applications.

One approach has been to use an elastomeric material in combination with a relatively lubricious material.

U.S. Pat. No. 4,133,927 (Tomoda) describes composites of rubber and a porous PTFE layer, describing these to have low friction resistance and potential uses for sealing materials, belts, valves, pumps, etc. Tomoda describes the use of PTFE in the form of a PTFE "paper", a film obtained by skiving PTFE foam, or a uniaxially expanded PTFE material.

The use of PTFE polymers in sealing materials has been known since the 1970s, for example, based on U.S. Pat. No. 3,644,916 (Gore). Gore describes the fibrillar structure of ePTFE tapes, their lower specific gravity relative to unexpanded forms of PTFE, as well as processing temperatures, pressures, and stretching procedures to produce ePTFE tapes. The fibrilla structure is described in U.S. Pat. No. 3,315,020 and sintering is described in U.S. Pat. No. 3,002,770, reporting a sintering temperature of PTFE to be 620° F., or 326.7° C., at which PTFE changes from a crystalline to an amorphous state. Gore further describes that if PTFE is expanded under ambient conditions, it reacts elastically when released from tension, therefore guiding heating above 200° C., but below 342° C., and preferably to about 300° C., under bi- or uniaxial expansion/tension.

U.S. Pat. No. 7,658,387 (Park) describes a dynamic seal formed from a processable rubber that includes a vulcanised elastomeric material and a filler powder, such as PTFE, dispersed therein. Optionally one or more further functional fillers may be included.

Whilst PTFE-coated elastomer articles are previously known, they are associated with difficulties in binding the PTFE to the elastomer. Moreover, PTFE coated elastomer is not generally associated with high-wear dynamic sealing applications, such as in pumps, engines and the like.

Accordingly, there remains a need for improved seals, particular for use in dynamic sealing applications.

SUMMARY OF THE INVENTION

According to a first aspect of the invention there is provided a sealing element having a sealing surface for providing a seal against a contact surface, the sealing element comprising:
  an elastomeric body comprising an elastomeric material; and
  a sintered polytetrafluoroethylene (PTFE) film coupled to the elastomeric body, and defining the sealing surface;
  the film having a thickness between around 25 microns and 200 microns, and the film comprising between around 5 wt % and 40 wt % of a lubricious particulate material and having a thickness between around 25 microns and 200 microns.

In use, where there is pressure applied between the contact surface and the sealing surface, the sealing element restricts or blocks fluid from passing between the sealing element and the contact surface.

The sintered PTFE film thickness may be between around 25 m and 150 μm, between around 25 μm and 100 μm, between around 25 μm and 75 μm, or between around 35 μm and 75 μm.

The sealing element has a dynamic coefficient of friction (CoF) at the sealing surface that is significantly lower than the dynamic coefficient of friction of the elastomeric material. The low coefficient of friction on the sealing surface being provided by the film. The dynamic coefficient of friction on the sealing surface is preferably less than 0.5, more preferably less than 0.4, aid most preferably less than 0.3 for the life of the sealing element. To provide the low CoF at the sealing surface for the life of the seal the film is resistant to wear and abrasion such that the film layer along the sealing surface is never completely worn through to the rubber body. Incorporation of a lubricious material in the PTFE film significantly increases the wear life of the sealing element, without unduly compromising the low-friction properties of the sealing surface. This is of particular benefit in dynamic sealing applications.

The sintered PTFE film is sufficiently thin and compliant to provide the required sealability.

The sintered PTFE film is capable of conforming to a required sealing surface shape and configuration, and to deform together with the elastomeric body. This property may be referred to as "mouldability"; i.e. the ability to form or shape a film to the moulded part geometry in the rubber moulding process without any preforming of the film.

The sintered PTFE film may be the same size as the sealing surface or may extend beyond the sealing surface. That is to say, a part of the sintered PTFE film may define the sealing surface, or the complete sintered PTFE film may define the sealing surface.

The thickness of the sintered PTFE film may be measured from an SEM image of a cross section of the sealing element (through the sealing film normal to the sealing surface), as the distance normal to the outer surface of the sintered PTFE film, between said outer surface and the boundary to the adjacent layer or material.

Where the said sintered PTFE film is coupled directly to the elastomeric body, the thickness is the distance of the outer surface of the film to the boundary between the sintered PTFE film and elastomeric material of the body. Where the said sintered PTFE film is coupled to the elastomeric body by one or more intermediate layers or materials (such as adhesive), then the thickness is the distance of the outer surface of the sintered PTFE film and the bounday between the sintered PTFE film and the adjacent intermediate layer or material.

It should be understood that there may be a degree of variation in thickness of the sintered PTFE films disclosed herein, either as a consequence of the method of manufacture of the film itself and/or of the method of manufacture of the sealing element. The standard deviation of film thickness may vary from as low as around 1-2% of the average (mean) thickness, to around 10%, 15% 20% or 25% of the average thickness.

Accordingly, the thickness of the sintered PTFE film may be an average thickness calculated from at least 10 measurements taken from an SEM image at a magnification of at least 500.

The sintered PTFE film defining the sealing surface may comprise a dispersion of the lubricious particulate material. For example, the film may be formed from a PTFE material obtained by evenly mixing the lubricious particulate material and PTFE powder, and compressing or extruding the mixture.

The amount of lubricious particulate material in the PTFE film defining the sealing surface may be determined by any known analytical method.

One method may be used is the energy dispersive X-ray spectroscopic imaging (EDS imaging) of a cross section of the sealing element, as explained in detail below.

Another known method is the TGA method (Thermogravimetric analysis), to determine the amount of lubricious particulate material in the PTFE film, can be used. Other methods may be used by skilled person in the art.

The sintered PTFE film defining the sealing surface may comprise between around 10 wt % and 40 wt %, between around 10 wt % and 30 wt %, or between around 10 wt % and 20 wt % of a lubricious particulate material.

The lubricious particulate material may be uniformly distributed throughout the sintered PTFE film defining the sealing surface.

The lubricious particulate material may be distributed to some extent unevenly throughout the thickness of the sintered PTFE film defining the sealing surface.

In some embodiments, a surface region of the sintered PTFE film extending through a minor portion of a thickness of the sintered PTFE film may comprise a lower proportion of lubricious particulate material than is present through the remaining major portion of the thickness of the film. The minor portion may be below 5 microns, or below 2 microns or below or around a micron.

In other words, the sealing surface may in some embodiments comprise a lower proportion of lubricious particulate material than is present throughout the thickness of the said film.

Said uneven distribution may be evident for example from a comparison of EDS imaging of the sealing surface, in comparison to EDS imaging taken of a cross section through the sintered PTFE film defining the sealing surface.

A ratio of the proportion of lubricious particulate material at the sealing surface to the proportion of lubricious particulate material throughout the thickness of the film may be determined by the ratio of the carbon to fluorine ratio (C:F) as measured normal to the sealing surface to the C:F as measured through the thickness of the sintered PTFE film.

The ratio of the C:F ratios may be less than or equal to 0.8; less than or equal to 0.7 or less than or equal to 0.6.

Thus the invention extends to a sealing element having a sealing surface for providing a seal against a contact surface, the sealing element comprising:
  an elastomeric body comprising an elastomeric material; and
  a sintered polytetrafluoroethylene (PTFE) film coupled to the elastomeric body, and defining the sealing surface;
  the film having a thickness between around 25 microns and 200 microns, wherein the ratio of the Carbon (C):Fluorine (F) ratio as measured normal to the sealing surface of the sintered PTFE film to the C:F ratio as measured normal to the thickness of the sintered PTFE film is less than or equal to 0.8; less than or equal to 0.7; less than or equal to 0.6.

Conversely, in some embodiments, a surface region of the sintered PTFE film extending through a minor portion of a thickness of the sintered PTFE film may comprise a higher proportion of lubricious particulate material than is present through the remaining major portion of the thickness of the film. The ratio of the C:F ratios may for example be greater than or equal to 0.6; greater than or equal to 0.7 or greater than or equal to 0.8.

Regardless of the distribution of the lubricious particulate material in the sintered PTFE film of the sealing element, the sealing element may be made from a sintered PTFE film, or a PTFE film, having another distribution of lubricious particulate material (e.g. an even dispersion thereof). In some embodiments, the PTFE film from which the sealing element is made comprises the range of between around 5 wt % and 40 wt % of the lubricious particulate material. Thus, the invention extends to a sealing element having a sealing surface for providing a seal against a contact surface, the sealing element comprising:
  an elastomeric body comprising an elastomeric material; and
  a sintered polytetrafluoroethylene (PTFE) film coupled to the elastomeric body, and defining the sealing surface;
  the film having a thickness between around 25 microns and 200 microns, and the film being formed from a PTFE material comprising between around 5 wt % and 40 wt %, or 5 wt % and 25 wt % of a lubricious particulate material.

By formed from, we refer to the starting material used to make the PTFE film which is subsequently coupled to the body.

The sintered PTFE film defining the sealing surface may comprise skived PTFE (i.e. a film sliced from a PTFE material), a cast PTFE, expanded PTFE or an extruded PTFE (e.g. a PTFE tape).

The sintered PTFE film defining the sealing surface may be an expanded PTFE (ePTFE) film.

The sintered ePTFE film defining the sealing surface may be uniaxially or biaxially expanded.

An ePTFE film or membrane may comprise a porous microstructure of interconnected nodes and fibrils. The pores are defined between the nodes and fibrils.

The sintered ePTFE film defining the sealing surface comprises a porosity of less than or equal to 25%.

In embodiments the porosity is less than or equal to 20%, 15% or 12%. In one embodiment the porosity is less than 20%.

As known in the art, and disclosed in Gore, ePTFE may be formed by expanding a (substantially non-porous) PTFE tape or film in one or two directions, below the crystalline melt temperature (expansion is conducted typically around 250 Celsius) of the PTFE. Multiple expansion steps can be performed in each direction of expansion. The physical properties may be tuned by varying the temperature and/or rate of the expansion steps, as well as the overall amount of the expansion steps and the number of expansion steps.

An ePTFE material may be "sintered" (also known as amorphous locking) by heating above the crystalline melt temperature of PTFE (around 327° C.) while the dimensions of the membrane or film are maintained. The resulting phase change increases the density of the PTFE from which the nodes and fibrils are formed, but the overall porous microstructure is substantially unchanged.

Sintered PTFE is characterized by a crystalline melt temperature at around 327° C. as measured by a Differential Scanning calorimeter (DSC) Instrument model Q2000. Unsintered PTFE would have a crystalline melt temperature of around 345° C. The DSC Q2000 runs at a temperature ramp rate of 10 degrees C./minute. When the scan shows that the endothermic peak drops nearly 20 degrees from about 345° C. to 325° C. the sample is considered "sintered".

Sintering may be associated with an increase in the strength of the ePTFE. Sintering may increase the wear resistance of the film.

Whilst sintering may significantly increase the wear life of the film, the low-friction properties of the sealing surface are not unduly compromised. This is of particular benefit in dynamic sealing applications.

At least one surface of the sintered PTFE film defining the sealing surface may be porous.

A surface of the sintered PTFE film (such as a skived, casted or extruded film) may be treated to provide porosity, by laser or chemical etching or the like. Such treatment may be provided before or after sintering. Or, as described above, the film may comprise ePTFE.

A porous surface may assist in bonding between the film and the adjacent material, for example an adhesive or the material of the elastomeric body. A porous film surface may provide a bondable surface. i.e. the porous surface comprises an enhanced affinity for adhesion to the elastomeric body. In some embodiments, an adhesive may penetrate the pores and thereby improve adhesion.

In some embodiments, the elastomeric material of the body may penetrate the pores.

A porous PTFE film may improve the moulding and conforming properties of the film.

The sealing surface may be porous, for example in embodiments comprising a sintered ePTFE defining the sealing surface. The porosity of the sealing surface may be minimal or close to nonporous to achieve the low CoF property of the PTFE film.

The sintered ePTFE film defining the sealing surface may for example have a porosity in the range from around 10% to 30%, and a CoF of around 0.15 to 0.4. Porosity may be between around 18 or 20 and 25% and CoF may be between around 0.18 and 0.33. Porosity may be between around 10-15% and CoF may be between around 0.18 and 0.27, or 0.18 and 0.22.

In embodiments comprising a sintered ePTFE film (defining the sealing surface and/or adjacent to the elastomeric body, for example in embodiments comprising an intermediate film or membrane discussed in further detail below), elastomeric material (or adhesive, as the case may be) may penetrate partially through a thickness of the film—i.e. such that the film comprises a penetrated region adjacent to the elastomeric body in which elastomeric material is present in the pores of the ePTFE film, and an unpenetrated region adjacent to the sealing surface. The elastomeric material or adhesive may penetrate to a depth of 5-10 microns, or 1-10 microns, or 1-5 microns, wherein the majority of the thickness of the film is unpenetrated. As with the thickness of the film itself, it will be understood that the depth of penetration may vary across the said film.

The sealing element may comprise at least one intermediate layer between the sintered PTFE film defining the sealing surface and the elastomeric body.

The sealing element may comprise at least one intermediate thermoplastic layer. Thermoplastic layers may comprise FEP, PFA PVDF or similar materials.

The sealing element may comprise an intermediate adhesive layer. An adhesive layer may be formed from a layer of a flexible adhesive such as a silicone or an elastomeric material (which may be of the same or a different composition to that of the body). Typically an adhesive is applied in a flowable form (e.g. uncured or partially cured, or mixed with a solvent etc) so that it can penetrate any pores of the adjacent layer, when heated and/or compressed during manufacture of the sealing element.

The thickness of the sintered PTFE film defining the sealing layer and the or each intermediate layer may together be between around 30 and 250 microns, between around 30 and 100, or between around 30-80 microns, or between around 30-50 microns, or between around 50-150 microns.

For example, in some embodiments, the sealing element may comprise a multilayer laminate, the multilayer laminate comprising the sintered PTFE film defining the sealing surface and at least one intermediate layer.

The sintered PTFE film defining the sealing surface may itself be a multilayer laminate.

The sintered PTFE film defining the sealing surface, and the at least one intermediate layer may be the same or different. Indeed, the sealing element may comprise more than one intermediate layer, and optionally more than one type of intermediate layer.

The multilayer laminate may comprise the sintered PTFE film defining the sealing surface aid a porous PTFE (e.g. ePTFE) intermediate film layer adjacent to the elastomeric body. The porous PTFE intermediate film layer may have a penetrated region, in which elastomeric material is present in the pores, and the penetrated region may extend at least partially through the thickness of the intermediate film layer.

For example, the sealing element may comprise an intermediate PTFE film layer, which lacks any particulate material or filler, such as a native intermediate ePTFE film layer. The at least one intermediate ePTFE film layer may be sintered or unsintered, may have a different porosity, thickness, density and/or average pore size than the sintered ePTFE film defining the sealing surface.

For example, the sintered ePTFE film defining the sealing surface may have a higher density and/or lower average pore size, for the purposes of providing a suitable sealing surface for a dynamic seal. Whereas, the at least one intermediate ePTFE film layer may have a larger average pore size and/or lower density for the purposes of coupling to an elastomeric body, in use.

The sintered PTFE film defining the sealing surface and a said intermediate layer may be fused together, under the action of heat and/or pressure. Adhesive may also be used to couple the films of a multilayer laminate together.

A sintered PTFE film may be laminated (prior to or during coupling to the elastomeric body) with a further film layer. The sintered PTFE film may be configured to provide the sealing surface and the further film layer may be configured as an intermediate film layer, to provide a strong bond to an elastomeric body.

The porosity of any ePTFE films present can be selected according to particular requirements. For example, a sintered PTFE film that will ultimately define the sealing surface have a porosity of less than 25%, whereas an ePTFE film with a porosity of more than 25% may be used for forming a bonding layer to the elastomeric body. It should be understood that the porosity of each film prior to manufacture may be significantly higher, for example above around 75%, 80% or 85%, and may be selected to provide for the desired porosity of the sealing element.

The pore sizes of any ePTFE films present can also be selected according to particular requirements. For example, a larger average pore size may be required to facilitate ingress of adhesive or elastomer, to bond to the elastomeric body.

It may for example be desirable for some high-wear applications, for the sealing surface to be defined by a relatively high-density PTFE or ePTFE material (i.e. above around 0.6 or 0.7 g/cm$^3$; and below around 1.5 g/cm$^3$ or below around 1.0 g/cm$^3$). Porosity decreases with increasing density.

Whereas, an ePTFE membrane of lower density (e.g. below around 0.5 g/cm$^3$) adjacent to the elastomeric body may promote penetration of the elastomeric material into the pores.

A porous intermediate film layer, such as an intermediate ePTFE film layer, may comprise penetrated and unpenetrated regions generally as described above, or in some embodiments substantially all of an intermediate ePTFE film layer may be penetrated by the elastomeric material or adhesive as the case may be.

It must be understood that the elastomeric material may, during manufacture of the sealing element, penetrate into the pores of an ePTFE film to some extent unevenly. In addition the thickness of the ePTFE itself may vary across the film at least to some extent, as discussed above. Thus, the thickness penetrated region as a proportion of the thickness of the film may vary. Moreover, the degree of penetration of the elastomeric material (by which we mean the proportion of the filling of the pores) may decrease with depth.

Moreover, as disclosed herein, the elastomeric material may comprise multiple components, and the rates of penetration of each component into the membrane may differ to some degree. The elastomeric material may be combined with a said ePTFE film as a precursor formulation. A precursor formulation may comprise elastomeric material in an uncured or partially cured form and/or one or more components thereof may be present as a suspension or solution. The rates of diffusion or flow of components into the porous ePTFE microstructure may vary. Moreover, the rate of diffusion or flow of each component of a melt of the elastomeric material comprising multiple components, may vary. Compositional gradients may therefore exist within the elastomeric material of the penetrated region, and consequential compositional gradients may also extend into the elastomeric body.

In embodiments having an ePTFE film (or films), the or each ePTFE film may be at least partially densified.

Densification is a process whereby the porous microstructure of the ePTFE is at least partially collapsed, under the effects of compression and optionally elevated temperature. Partial densification may occur during manufacture, for example during injection or compression moulding, and/or lamination.

Densification is associated with a reduction in the porosity of ePTFE and, in the case of an ePTFE film correlates to a reduction in thickness, in comparison to a starting material.

Densification may be greater in an unpenetrated region of an ePTFE film or layer than in a penetrated region. A penetrated region may, in some embodiments, be substantially non-densified (i.e. the porous microstructure may be generally unchanged as compared to the membrane prior to penetration).

Where the sintered PTFE film defining the sealing surface is ePTFE, densification may generally decrease with distance from the sealing surface, though the thickness of the sintered ePTFE film defining the sealing surface.

A partially densified ePTFE film may retain some residual porosity (e.g. via the preferential flow pathways). This may allow any gases produced during manufacture to escape via the sealing surface. Such gasses may be displaced by a flow front of elastomeric material (or a precursor thereof) during moulding, may be generated during a curing reaction, and/or solvents or other volatile components may evaporate during curing, setting or drying of the elastomer material. Escape of such gasses via the sealing surface (i.e. through the sintered PTFE film defining the sealing surface, and optionally one or more further ePTFE intermediate film layers) may aid in avoiding, or at least limiting, the formation of bubbles at the sealing surface. Aside from maintaining the planarity and/or smoothness of the surface of the seal, this permeability may avoid consequent brittleness and losses in mechanical properties.

The overall densification of an ePTFE film, in particular a sintered ePTFE film defining the sealing surface, may be around 60%, 70%, 75% or 80% (as measured by change in film thickness from prior to manufacture of the sealing element).

The partially densified ePTFE may have a residual porosity of less than 25%.

The sealing element may be for use in forming a wide variety of seals, including dynamic seals or static seals, such as o-rings, o-ring boss seals, piston rings, diaphragm seals, wiper seals and the like, or gaskets such as sheet gaskets, kammprofile gaskets (i.e. a grooved metal or serrated gasket), fishbone gaskets, flange gaskets, and the like.

The sealing element may be for use as a seal for a hydraulic pump, a valve, a thermal management module, a transmission, a gear box, an engine, a motor, a compressor, a hydraulic cylinder, or a pneumatic cylinder, or the like.

The sealing element may comprise a sealing surface of any suitable shape or configuration, and may include curved (excurvate or incurvate) regions and/or flat regions. The sealing surface may be continuous or discontinuous.

The sealing element may comprise two or more, or multiple sealing surfaces.

The sealing film may be coupled to a portion of, or over all of, the external surface(s) of the elastomeric body.

The sealing element may be for use in forming a dynamic seal; i.e. wherein, in use, the contact surface slides in relation to the sealing surface. A dynamic seal may be provided between moving parts of a mechanism, such as between a valve seat and a valve member, or between rotating parts such as in a fluid pump. A dynamic seal must have a sealing surface that is sufficiently low-friction to allow movement between mechanical parts, without causing undue wear of the contact surface, but in addition have a suitable wear life for the parts in question, which may be months or even years in some cases.

The sealing element may have a majority of their mass as the elastomeric body, particularly at least 75 wt %, at least 85 wt %, or at least 95 wt %, of the elastomeric body, with the remainder of the mass being the sintered PTFE film defining the sealing surface, and optionally one or more intermediate film layers.

A major component of the elastomeric material will also generally be made up from one or more elastomers. The one or more elastomers may make up of more than 80 wt %, more than 90 wt %, or more than 95 wt %, of the elastomeric material. Other constituents may also be present in the elastomeric material as minor components, such as fillers to modify impact strength, tensile strength, shear resistance, shear modulus, and/or other mechanical properties, additives and/or coatings to modify chemical resistance, as well as colorants and/or mass modifiers, as known in the art.

The elastomeric material may comprise any suitable elastomer or elastomers, including thermoplastic or cross linked (cured) elastomer. The elastomeric material may comprise an unsaturated base polymer, a saturated base polymer, or both, and may vulcanize with sulfur or with a non-sulfur cross-linking agent. Examples of suitable elastomers include, either alone or in combination, natural rubbers (polyisoprenes), butadienes, ethylene propylenes (EPR, or EPM), ethylene propylene dienes (EPDR, or EPDM), styrene-butadienes (SBR), isobutenes, urethanes, acrylics or nitriles (acrylonitrile-butadienes, i.e., ABR), halogenated nitriles, chloroelastomers such as chloroprenes, (per)fluoroelastomers, silicones, fluorosilicones, epichlorohydrin rubbers, polyether block amides (PEBA), chlorosulfonated polyethylenes (CSM), ethylene-vinyl acetates (EVA), etc.

The lubricious particulate material may be provided in the form of a powder or in microfibrous form (by which we include fibres having a micro-scale dimension across, but not necessarily along the length of the fibres). The lubricious particulate material may comprise micro-particles and/or nano-particles (these terms being used in accordance with their normal IUPAC definitions).

The lubricious particulate material may have a particle size between around 5 µm and 20 µm. In the embodiment of graphite particulate material, the particle size may between around 6.5 µm and 19 µm.

The lubricious particulate material may comprise a carbon-based component, such as graphite, charcoal, carbon black (a soot-like material formed from a carbonisation process such as incomplete combustion or pyrolysis), or any other suitable particulate carbon-based component formed from carbonisation of synthetic or natural organic materials, such as wood, biomass, plastics and the like.

The lubricious material may consist essentially of graphite, or a mixture of graphite and one or more particulate carbon-based components.

The lubricious particulate material may comprise a lubricious mineral such as a talc, a clay, or any other suitable inorganic component(s) such as a layered sulphide component (e.g. $MoS_2$) or inorganic polymer component such a polysilicate or polyaluminate component.

The lubricious material may comprise one or more such components.

In one embodiment the sintered PTFE film comprises a lubricious particulate material and at least one additional particulate or fibrous material. The additional particulate or fibrous material can be selected from the group comprising glass fibre, glass powder, silica, titanium dioxide, polyetheretherketone (PEEK), polyphenylene sulphide (PPS)).

The sealing surface may have a dynamic coefficient of friction of less than 0.5, less than 0.4, or less than 0.3. The "dynamic coefficient of friction" is the factor by which the frictional resistance of objects in motion against a surface (as distinguished from the static coefficient of friction) and measurements were obtained in accordance with ASTM D3702 after 24 hours. Generally, the dynamic coefficient of friction of the inventive seals will be in the range of industrially available fluoropolymers, such as native PTFE, PVDF, fPEPP, and the like.

The overall wear rate of the sintered PTFE film defining the sealing surface measured in accordance with ASTM D3702 may be less than 0.1 microns/hr, or less than 0.07 microns/hr, or less than 0.05 microns/hr.

A PTFE film, in particular an ePTFE film, advantageously has a high elongation to break, enabling it to withstand the forces applied during manufacture of the sealing element. For example, during injection or compression moulding, the sintered PTFE film defining the sealing surface must resist rupture under the hydraulic pressure of the elastomeric material, or precursor thereof.

The film used to form the sintered PTFE film defining the sealing surface may have an elongation-to-break of at least 50%, or at least 60%, in at least two orthogonal directions. The elongation-to-break may be between around 10-100%, or between around 15-90%, or between around 20-85%. The elongation-to-break may be greater than 100%, or greater than 125%.

It is to be understood however that the elongation-to-break, etc. of a given film may differ in each direction, for example if the expansion conditions of an ePTFE film in each direction vary. By elongation-to-break, thickness, porosity of the film etc. we refer to the properties of the film before it is formed as part of the sealing element.

A second aspect of the invention is a sintered ePTFE film for use in the manufacture of a sealing element, the film comprising between around 5 wt % and 40 wt % of a lubricious particulate material and having a thickness between around 25 microns and 700 microns.

The sintered ePTFE film may be uniaxially or biaxially expanded.

The thickness may be between around 25 and 500 microns, or 25 and 300 microns.

The mass/area of the sintered ePTFE film may be between around 50-200 $g/m^2$, or between around 50-150 $g/m^2$, or between around 75-150 $g/m^2$.

The sintered ePTFE film may form part of a multilayer (i.e. two or more layers) laminate.

Accordingly, in a third aspect, the invention extends to a multilayer laminate, for use in the manufacture of a sealing element, the laminate comprising a sintered ePTFE film comprising between around 5 wt % and 40 wt % of a lubricious particulate material and having a thickness between around 25 microns and 700 microns, coupled to at least one further film layer.

As disclosed herein, the sintered ePTFE film in use forms the sealing layer of a sealing element of other aspects, whereas a further film layer may be optimised for other purposes—for example to bond to the elastomeric body, or to assist bonding between further film layers.

The overall thickness of the laminate may be between 25 and 700 microns. In some embodiments, the sintered ePTFE film intended to define the sealing surface of a sealing element comprises at least 50% or at least 75% of the overall thickness of the multilayer laminate.

The sintered ePTFE film and the at least one further film layer may be the same or different. For example, the at least one further film may be PTFE or ePTFE, and lack any particulate material or filler. An at least one further ePTFE film may have a different porosity, thickness, density and/or average pore size than the ePTFE sealing film. An at least one further PTFE film may be sintered or unsintered. At least one said further film may be a thermoplastics film layer.

The sintered ePTFE film and at least one further film layer may be fused together, under the action of heat and/or pressure. Adhesive may also be used to couple the films together. Sintering may be performed before or after lamination.

The lubricious particulate material may comprise or consist essentially of graphite.

The sintered ePTFE film, or multilayer laminate comprising said sintered ePTFE film, may be combined with an elastomeric material forming an elastomeric body, and coupled to the film or multilayer laminate, to form a sealing element. Where the layer facing the elastomeric body is an ePTFE layer, the film or laminate may be coupled to the elastomeric body at a penetrated region (in which elastomeric material penetrates the porous microstructure of an adjacent film).

The invention extends in a fourth aspect to a method of manufacturing a sealing element having an elastomeric body and a sealing surface for providing a seal against a contact surface, the method comprising:
   providing a sintered PTFE film, the sintered PTFE film comprising between around 5 wt % and 40 wt % of a lubricious particulate material;
   placing the sintered PTFE film over at least a part of a surface of a mould cavity; and
   introducing an elastomeric material into the mould cavity to overmould the sintered PTFE film and form a sealing element, wherein the sintered PTFE film is coupled to the elastomeric body, has a thickness of between around 25 and 200 microns and wherein the sintered PTFE film defines the sealing surface.

In embodiments wherein the sintered PTFE film comprises or consists of an ePTFE film, the thickness before overmoulding may be between around 25 and 700 microns. During overmoulding the ePTFE film may become at least partially densified, such that the thickness of the sintered ePTFE film defining the sealing layer of the sealing element has a thickness of between around 25 and 200 microns.

In some embodiments, for example wherein sintered PTFE film is skived or cast or extruded, the thickness of the film may not change during overmoulding, and thus the starting thickness may be between around 25 and 200 microns.

The invention extends in a fifth aspect to a method of manufacturing a sealing element having an elastomeric body and a sealing surface for providing a seal against a contact surface, the method comprising:
   providing a multilayer laminate in accordance with the third and other aspects disclosed herein; the multilayer laminate comprising a sintered PTFE film, the sintered PTFE film comprising between around 5 wt % and 40 wt % of a lubricious particulate material;
   placing the multilayer laminate over at least a part of a surface of a mould cavity with the sintered PTFE film facing the surface of the mould cavity; and
   introducing an elastomeric material into the mould cavity to overmould the multilayer laminate and form a sealing element, wherein the multilayer laminate is coupled to the elastomeric body, and wherein the sintered PTFE film thereof defines the sealing surface aid has a thickness of between around 25 and 200 microns.

The sintered PTFE film or multilayer laminate may be gas permeable and/or porous, as disclosed herein.

A gas permeable sintered PTFE film or multilayer laminate may facilitate a flow of gas through the film or laminate during moulding (and in some embodiments curing or drying of the elastomeric material of the body or adhesive). This reduces the risk of rupture, blistering etc.

In embodiments in which a porous surface is provided facing into the mould or cavity, during the overmoulding process (i.e. away from the mould surface), the sintered PTFE film or multilayer laminate may become penetrated by the elastomeric material, to form a penetrated region adjacent to the elastomeric body. At least in part, the intimate interface between the elastomeric material and the membrane will couple the sealing film to the elastomeric body.

In this way, in some embodiments, the sintered PTFE film or the multilayer laminate can be coupled directly to the elastomeric body, without the need to use adhesives.

The method may comprise introducing the elastomeric material into the mould cavity in the form of a precursor material.

The method may further comprise treating the precursor formulation to form the elastomeric material.

Treatment of the precursor formulation may comprise drying, setting and/or curing.

The precursor formulation may for example comprise elastomeric material in an uncured or partially cured form, and the method may comprise curing the precursor formulation.

Accordingly, the method may comprise penetrating the pores of the sintered PTFE film or multilayer membrane and then curing (or otherwise treating) to form the elastomeric material "in situ". Curing or treating may be conducted within the mould cavity.

Curing may include cross linking polymeric or oligomeric species, for example by vulcanisation. Curing may comprise polymerisation, of further polymerisation of monomer or oligomer species within the precursor formulation.

The precursor formulation may comprise a solution of an elastomeric material, or precursor species thereof. The precursor formulation may comprise a suspension or dispersion of an elastomeric material or precursor species thereof. The method may accordingly comprise drying, to remove solvent.

The treatment of the precursor formulation may comprise heating, for example to promote drying and/or curing.

In some embodiments, the method may comprise lining at least a part of a surface of a mould cavity with the sintered PTFE film or the multilayer laminate, and then with at least one further film layer. One or more intermediate adhesive layers may also be provided.

The method may comprise any suitable method of overmoulding, including injection moulding (in which the elastomeric material or precursor formulation is injected in fluid form into a mould cavity) or compression moulding (in which the elastomeric material or precursor formulation is placed within or across a first part of a mould in a pliable solid form, and compressed within a mould cavity defined between the first part of the mould and a second part of the mould).

Injection moulding may include foam moulding (in which the elastomeric material or precursor formulation includes a carrier gas, so form a structural foam elastomeric body), or may be gas assisted (introduced into the mould cavity under a pressure of a gas such as air or nitrogen).

Other moulding method may also be used, such as rotomoulding, transfer moulding or the like.

During the step of overmoulding, in particular using methods such as compression moulding and injection moulding methods, the use of a gas permeable sintered PTFE film or multilayer laminate allows gases to escape the mould cavity via the sealing film. This reduces the risk of rupture, blistering etc.

Where the sintered PTFE film or multilayer laminate comprises ePTFE, during the step of overmoulding, in particular using methods such as compression moulding and injection moulding methods, partial densification may occur, as disclosed herein.

In embodiments comprising a sintered ePTFE film facing the mould surface, the said ePTFE film may be compressed between the mould surface(s) and the advancing elastomeric material or precursor formulation, resulting in partial densification of at least a region extending from the sealing surface of the resulting sealing element.

Providing the sintered PTFE film or multilayer laminate may comprise forming an ePTFE film or membrane. Suitable methods of forming an ePTFE film are well known in the technical field of the invention, and may be based generally on those described in U.S. Pat. No. 3,953,566 or in U.S. Pat. No. 5,814,405, which are incorporated in their entirety herein. The manufacture of a PTFE tape comprising a lubricious particulate material, from which a membrane comprising the lubricious material is made, is described in U.S. Pat. No. 4,256,806.

An ePTFE film may be formed by uniaxially expanding a PTFE tape. The method may comprise biaxially expanding a PTFE tape (by expanding the tape in a first direction and then in a second, typically orthogonal, second direction).

The expansion steps may be conducted by passing the tape or film through a series of at least two sets of rollers, wherein the relative rates of rotation of the rollers determines the expansion ratio. The PTFE tape itself may be extruded.

The method may comprise forming an ePTFE film comprising the said lubricious particulate material. For example, particles of the lubricious particulate material may be mixed with PTFE powder and optionally additional components such as a lubricant, and extruded to form a PTFE tape comprising between 5 wt % and 40 wt % of lubricious particulate material. The tape may then be expanded and sintered, to form a sintered PTFE film comprising said lubricious particulate material.

Providing the multilayer laminate may comprise providing a first PTFE film, and a second film, at least the first PTFE film comprising said lubricious particulate material; and laminating the first and second films, to form the multilayer laminate. At least the first PTFE film is sintered. Sintering may be performed before, during or after laminating.

The method may further comprise sintering one or more ePTFE films.

The method may comprise further steps required to prepare a finished sealing element, such as trimming of excess sealing film and/or trimming or grinding down the elastomeric body, when the sealing element is removed from the mould.

A sealing element within the scope of the claims may have superior bonding between the sealing film and the elastomeric body, and it may have improved wear resistance, gas permeability, flexibility, and/or durability relative to known seals using fluoropolymers bonded to elastomeric bodies.

The term "providing" includes merely using.

Lining the mould surface may comprise placing a sheet of the sintered PTFE film or the multilayer laminate, and optionally one or more further film layers, onto a mould surface (oral entire surface of a first part of a mould). The sintered PTFE film or multilayer laminate may be placed in multiple pieces, for example according to a pattern, so as to accommodate complex mould configurations.

The or each layer lining the mould surface may be caused to conform or further conform to the shape of the mould during overmoulding.

The method may also comprise flowing gas into the mould cavity, or pressurising the mould cavity, so as to cause the sintered PTFE film or multilayer laminate (or optional one or more further film layers) to conform or further conform to the shape of the mould.

The invention in a sixth aspect extends to a sealing element obtainable by the methods of the fourth and fifth aspects.

Further optional features of each aspect of the invention correspond to optional features of any other aspect of the invention.

All patent documents or other publication referred to above are incorporated herein in their entirety.

DESCRIPTION OF THE DRAWINGS

Non-limiting example embodiments are described in greater detail below with reference to the figures, in which.

DETAILED DESCRIPTION OF EXAMPLE EMBODIMENTS

A series of test and comparative examples of moulded articles the same general construction test sealing elements were prepared using a compression moulding process, from a range of elastomeric materials and films, detailed below.

The moulded articles were of materials suitable for the manufacture of sealing elements, but of a shape and configuration adapted for the testing procedures described below.

Figure 4:
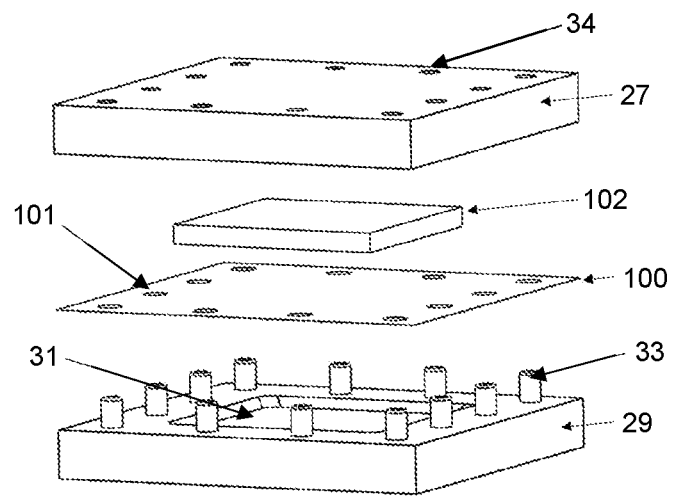
FIG. 4 shows the mould used to prepare test sealing elements.

The mould used for preparing the examples is shown in FIG. 4. The mould included a mould base 29 having a cavity 31 defining a mould surface. The mould cavity had dimensions of approximately 75 mm×75 mm×3 mm deep with a 45 degree chamfer around the perimeter thereof.

The mould base was placed on the lower platen of the hydraulic press (not shown) and centred on the platen. Pins 31 surround the cavity and correspond to apertures 34 in a mould top 27, to assist in holding the film 100 in position when placed over the mould base 29.

Film samples 100 were cut to size and provided with holes corresponding to the pins 31 in the mould base 29.

A block of uncured elastomeric material 102 was placed on top of the test film sample and centred in the mould over the mould cavity 31. The mould top 27 was placed on the mould base 29 using the pins 31 for alignment.

The mould base 29 and top 27 were pre-heated prior to placement of the film 100 and elastomeric material 102.

The elastomeric material 102 was then compression moulded to the film 100 using the hydraulic press (not shown) and cured in the mould 29. A press load of 146.4 kN (40,000 pounds) was used for each example. The press load was released after the end of the prescribed curing time. The mould and moulded part were removed from the press after the press load was released. The moulded part was removed from the mould immediately.

The excess film and elastomer was trimmed away from the perimeter of the moulded parts.

The uncured elastomer compounds used to prepare the examples were an FKM elastomer (Viton™ A), hydrogenated nitrile butadiene rubber (HNBR), and ethylene propylene diene monomer rubber (EPDM).

The FKM (Viton™ A) elastomer, compound number EE96070A, is commercially available from Eagle Elastomer, Inc. of Cuyahoga Falls, Ohio, USA. The EE96070A compound has a Shore A durometer of 75 when cured and post cured.

The HNBR rubber compound, compound number HNBR71B, is commercially available from J. J. Short Associates, Inc. of Macedon, New York, USA. The HNBR rubber has a Shore A durometer of 70.

The EPDM rubber, compound number EP70PEROX, is commercially available from J. J. Short Associates, Inc. of Macedon, New York, USA. The EPDM rubber has a Shore A durometer of 70.

The curing temperature and curing time for the FKM Viton™ A compound was 188° C. and 4 minutes, respectively. The molded examples made with the FKM Viton A elastomer were post cured in a preheated convective oven at 200° C. for 6 hours. The curing temperature and curing time for the EPDM compound was 160° C. and 20 minutes, respectively. The curing temperature and curing time for the hydrogenated nitrile butadiene rubber (HNBR) was 160° C. and 20 minutes, respectively.

The sintered PTFE films as used in the examples are manufactured as follows:

1. Sintered ePTFE Film with 24 wt % Lubricious Particulate Material

A PTFE aqueous dispersion containing approximately 22% by weight solids, the majority of which are PTFE particles having a particle size in a range from about 0.05 μm to about 5 μm was used to produce a 24% by weight graphite filled PTFE mixture. PTFE aqueous dispersion can be purchased from the Chemours Company.

The graphite used in this example was a high synthetic graphite 99% plus carbon Grade #TC305 which was purchased from Asbury Carbons and has a medium particle size between 6.5 and 19 μm.

1.6 kg of the aforementioned graphite was slurried into 27 kg (60 lb) of de-ionized water. The slurry was then coagulated with 5.17 kg of PTFE dispersion for a mix time of 3 minutes. The resulting coagulum was then dried at 1650° C. for 24 hours. The dried coagulum was then frozen at −30° C. for two hours, and then screened through a 6 mm opening screen to help turn the coagulum into a powder form. The powder was then lubricated with mineral spirits at a ratio of 0.22 kg of lubricant to 1 kg of powder by weight.

The lubricated powder was tumbled and the material was once again refrozen at −30° C. for 24 hours, and again re-screened through the 6 mm screen to break up any large lumps of the lubricated graphite/PTFE mixture. The resulting lubricated powder was then allowed to dwell at ambient room conditions for 24 hours.

The material was then poured into a preform to make a 10 cm diameter pellet and dwelled in a 49° C. oven for 24 hours prior to being extruded into a tape form. A double cavity die with a thickness of 660 μm was used to create an extrudate tape that was roughly 15 cm wide. The extrudate was then calendered through precision rollers to a thickness of 440 μm. The lubricant was then removed using an air floatation dryer with a set point temperature of 2100° C. at a 1:1 ratio.

The tape was then expanded in the longitudinal direction on a MDO drum expander at drum set point temperatures of 270° C. at a ratio of 2.0:1 and an approximate stretch rate of 30%/s.

The roughly 13 cm wide tape was then cut into roughly 38 cm lengths and placed into a biaxial expanding heated pantograph. This pantograph has the ability to grab and hold all edges of the tape and after some period of heat up time for the sample, the pantograph has the ability to apply a stretch ratio to one or both directions at the same or different stretch rates.

A temperature of 320° C., and a dwell time of 30 seconds prior to the expansion, was used. An additional expansion ratio of 1.25:1 in the machine direction was followed immediately by a 4:1 expansion ratio in the transverse direction; both at the same stretch rate of 35%/s.

The membrane was restrained on a frame and removed while the clamshell oven was then heated up to a temperature of 380° C. Once the oven settled at the 380° C. temperature, the membrane was transferred back to the pantograph frame for 1:1 restraining purposes and the membrane then received 90 seconds of oven dwell time to "amorphously lock" or "sinter" the sample before removing the oven and the membrane sample from the pantograph frame.

The resulting membrane was about 0.25 mm (10 mils) thick with a bulk density of 0.40 gcm$^{-3}$.

The resulting Tensile Strength was 7.85 MPa in the longitudinal direction and 7.28 MPa. in the transverse direction providing a near balanced strength membrane.

2. Sintered ePTFE Film with 12 wt % Lubricious Particulate Material

A PTFE aqueous dispersion containing approximately 22% by weight solids, the majority of which are PTFE particles having a particle size in a range from about 0.05 μm to about 5 μm was used to produce a 12% by weight graphite filled PTFE mixture. PTFE aqueous dispersion can be purchased from the Chemours Company. The graphite used in this example was a high synthetic graphite 99% plus carbon Grade #TC305 which was purchased from Asbury Carbons and has a medium particle size between 6.5 and 19 μm.

0.82 kg (1.8 lb) of the aforementioned graphite was slurried into 27 kg (60 lb) of de-ionized water. The slurry was then coagulated with 6 kg (13.2 lb) of PTFE dispersion for a mix time of 6 minutes. The resulting coagulum was then dried at 165° C. for 24 hours. The dried coagulum was then frozen at −30° C. for two hours, and then screened through a 0.635 cm (¼") opening screen to help turn the coagulum into a powder form.

The powder was then lubricated with mineral spirits at a ratio of 0.22 kg of lubricant to 1 kg of powder by weight. The lubricated powder was tumbled and the material was once again refrozen at −30° C. for 24 hours, and again re-screened through the 0.635 cm screen to break up any large lumps of the lubricated graphite/PTFE mixture. The resulting lubricated powder was then allowed to dwell at ambient room conditions for 24 hours.

The material was then poured into a preform to make a 10 cm (4") diameter pellet and dwelled in a 49° C. oven for 24 hours prior to being extruded into a tape form. A double cavity die with a thickness of 0.66 cm (26 mils) was used to create an extrudate tape that was roughly 15 cm (6 inches) wide.

The extrudate was then calendered through precision rollers to a thickness of 0.444 mm (17.5 mils) thick. The lubricant was then removed using an air floatation dryer with a set point temperature of 210° C. at a 1:1 ratio. The tape was then expanded in the longitudinal direction on a MDO drum expander at drum set point temperatures of 270° C. at a ratio of 2.0:1 and an approximate stretch rate of 30%/s The roughly 13 cm wide tape was then cut into roughly 38 cm lengths and placed into a biaxial expanding heated pantograph. This pantograph has the ability to grab and hold all edges of the tape and after some period of heat up time for the sample, the pantograph has the ability to apply a stretch ratio to one or both directions at the same or different stretch rates.

A temperature of 320° C. and a dwell time of 30 seconds prior to the expansion, was used. An additional expansion ratio of 1.25:1 in the machine direction was followed immediately by a 4:1 expansion ratio in the transverse direction; both at the same stretch rate of 35%/s.

The membrane was restrained on a frame and removed while the clamshell oven was then heated up to a temperature of 380° C. Once the oven settled at the 380° C. temperature, the membrane was transferred back to the pantograph frame for 1:1 restraining purposes and the membrane then received 90 seconds of oven dwell time to "amorphously lock" or "sinter" the sample before removing the oven and the membrane sample from the pantograph frame.

The resulting membrane was about 0.25 mm (10 mils) thick with a bulk density of 0.42 $gcm^{-3}$.

The resulting Tensile Strength was 8.51 MPa in the longitudinal direction and 9.42 MPa. in the transverse direction providing a near balanced strength membrane.

3. Sintered ePTFE Film with 6 wt % Lubricious Particulate Material

A PTFE aqueous dispersion containing approximately 22% by weight solids, the majority of which are PTFE particles having a particle size in a range from about 0.05 μm to about 5 μm was used to produce a 6% by weight graphite filled PTFE mixture. PTFE aqueous dispersion can be purchased from the Chemours Company. The graphite used in this example was a high synthetic graphite 99% plus carbon Grade #TC305 which was purchased from Asbury Carbons and has a medium particle size between 6.5 and 19 μm.

0.41 kg (0.9 lb) of the aforementioned graphite was slurried into 27 kg (60 lb) of de-ionized water. The slurry was then coagulated with 6.35 kg (14 lb) of PTFE dispersion for a mix time of 10 minutes. The resulting coagulum was then dried at 165° C. for 24 hours. The dried coagulum was then frozen at −30° C. for two hours, and then screened through a 0.635 cm (¼") opening screen to help turn the coagulum into a powder form.

The powder was then lubricated with mineral spirits at a ratio of 0.22 kg of lubricant to 1 kg of powder by weight. The lubricated powder was tumbled and the material was once again refrozen at −30° C. for 24 hours, and again re-screened through the 0.635 cm screen to break up any large lumps of the lubricated graphite/PTFE mixture. The resulting lubricated powder was then allowed to dwell at ambient room conditions for 24 hours.

The material was then poured into a preform to make a 10 cm (4") diameter pellet and dwelled in a 49° C. oven for 24 hours prior to being extruded into a tape form. A double cavity die with a thickness of 0.66 cm (26 mils) was used to create an extrudate tape that was roughly 15 cm (6 inches) wide).

The extrudate was then calendered through precision rollers to a thickness of 0.444 mm (17.5 mils) thick. The lubricant was then removed using an air floatation dryer with a set point temperature of 210° C. at a 1:1 ratio. The tape was then expanded in the longitudinal direction on a MDO drum expander at drum set point temperatures of 270° C. at a ratio of 2.0:1 and an approximate stretch rate of 30%/s.

The roughly 13 cm wide tape was then cut into roughly 38 cm lengths and placed into a biaxial expanding heated pantograph. This pantograph has the ability to grab and hold all edges of the tape and after some period of heat up time for the sample, the pantograph has the ability to apply a stretch ratio to one or both directions at the same or different stretch rates.

A temperature of 320° C., and a dwell time of 30 seconds prior to the expansion, was used. An additional expansion ratio of 1.25:1 in the machine direction was followed immediately by a 4:1 expansion ratio in the transverse direction; both at the same stretch rate of 35%/s.

The membrane was restrained on a frame and removed while the clamshell oven was then heated up to a temperature of 380° C. Once the oven settled at the 380° C. temperature, the membrane was transferred back to the pantograph frame for 1:1 restraining purposes and the membrane then received 90 seconds of oven dwell time to "amorphously lock" or "sinter" the sample before removing the oven and the membrane sample from the pantograph frame.

The resulting membrane was about 0.25 mm (10 mils) thick with a bulk density of 0.41 $gcm^{-3}$. The resulting Tensile Strength was 8.71 MPa in the longitudinal direction and 10.38 MPa. in the transverse direction providing a near balanced strength membrane.

4. Sintered PTFE Film with 25% Lubricious Particulate Material

A 0.13 mm thick skived PTFE film with 25% graphite filler that had been etched on side with a sodium ammonia etchant. The graphite filled etched skived PTFE film is commercially available from Enflo LLC of Bristol, Connecticut, USA.

5. Porous "POREX" PTFE Membrane

The Porex PM6M membrane is commercially available from Interstate Specialty Products of Sutton, Massachusetts, USA. The Porex PM6M porous PTFE membrane had a thickness of 0.1 mm (0.004") and a pore size of 5 microns (properties available on the supplier's website).

6. Natural Skived PTFE Film

The etched skived PTFE film is commercially available from Enflo LLC of Bristol, Connecticut, USA.

Table 1 summarizes the properties of the film materials as described above

TABLE 1

| Material | Thickness (μm) | Mass/Area (g/m²) | Density (g/cc) | Direction | Maximum Load (N) | Elongation at Maximum Load (%) | Maximum Stress (MPa) | Elongation at Break (%) |
|---|---|---|---|---|---|---|---|---|
| Porex PM6M | 104.1 | 147.1 | 1.413 | MD | 24.47 | 87.8 | 9.14 | 87.8 |
|  |  |  |  | TD | 26.24 | 81.1 | 9.96 | 81.1 |
| Natural Skived PTFE | 101.3 | 218 | 2.15 | MD | 96.97 | 348.9 | 37.72 | 348.9 |
|  |  |  |  | TD | 70.73 | 206.4 | 27.42 | 206.4 |
| 25% Graphite Filled Skived PTFE | 150.4 | 271.1 | 1.806 | MD | 35.59 | 11.6 | 9.36 | 11.6 |
|  |  |  |  | TD | 20.46 | 4.4 | 5.32 | 6.6 |
| 5% Graphite filled ePTFE Membrane | 320.0 | 145 | 0.453 | MD | 68.50 | 113 | 8.71 | 121.9 |
|  |  |  |  | TD | 87.63 | 94 | 10.38 | 101.1 |
| 12% Graphite filled ePTFE Membrane | 269.2 | 112 | 0.416 | MD | 58.72 | 94 | 8.51 | 107.5 |
|  |  |  |  | TD | 64.05 | 86 | 9.42 | 88.3 |
| 24% Graphite filled ePTFE Membrane | 243.8 | 99 | 0.407 | MD | 45.37 | 76 | 7.85 | 80.6 |
|  |  |  |  | TD | 48.04 | 61 | 7.28 | 63.6 |

(MD = machine direction; TD = transverse direction)

Example 1 (6% Graphite ePTFE/Viton)

A moulded article was prepared as described above with reference to FIG. 4, using 51 grams of the FKM Viton™ A elastomer compound and the 6% graphite filled ePTFE film. At the end of the 24 hour wear test (test protocol described below) the depth of the wear groove in the film layer was 51.6 microns. The coefficient of friction at the end of the wear test was 0.185.

Example 2 (12% Graphite ePTFE/Viton)

A moulded article was prepared using 49 grams of the FKM Viton™ A elastomer compound and the 12% graphite filled ePTFE film. At the end of the 24 hour wear test the depth of the wear groove in the film layer was 41.9 microns. The coefficient of friction at the end of the wear test was 0.181.

Example 3 (24% Graphite ePTFE/Viton)

A moulded article was prepared using 51 grams of the FKM Viton™ A elastomer compound and the 24% graphite filled ePTFE film. At the end of the 24 hour wear test the depth of the wear groove in the film layer was 32.5 microns. The coefficient of friction at the end of the wear test was 0.185.

Example 4 (6% Graphite ePTFE/HNBR)

A moulded article was prepared using 26 grams of the HNBR compound and the 6% graphite filled ePTFE film. At the end of the 24 hour wear test the depth of the wear groove in the film layer was 71.2 microns. The coefficient of friction at the end of the wear test was 0.268.

Example 5 (12% Graphite ePTFE/Hnbr)

A moulded article was prepared using 26 grams of the HNBR compound and the 12% graphite filled ePTFE film. At the end of the 24 hour wear test the depth of the wear groove in the film layer was 57.2 microns. The coefficient of friction at the end of the wear test was 0.220.

Example 6 (6% Graphite ePTFE/Hnbr)

A moulded article was prepared using 22 grams of the HNBR compound and the 24% graphite filled ePTFE film. At the end of the 24 hour wear test the depth of the wear groove in the film layer was 52.8 microns. The coefficient of friction at the end of the wear test was 0.213.

Example 7 (24% Graphite ePTFE/EPDM)

A moulded article was prepared using 25 grams of the HNBR compound and the 24% graphite filled ePTFE film. At the end of the 24 hour wear test the depth of the wear groove in the film layer was 63.2 microns. The coefficient of friction at the end of the wear test was 0.324.

Comparative Example 8 (Porex/Viton)

A moulded article was prepared using 49 grams of the FKM compound and Porex PM6M porous PTFE membrane. At the end of the 24 hour wear test the depth of the wear groove in the film layer was 87.9 microns. The coefficient of friction at the end of the wear test was 0.342.

Comparative Example 9 (4 Mil Natural Skived PTFE/EPDM)

A moulded article was prepared using 27 grams of the EPDM compound and a 0.1 mm thick natural skived PTFE film that had been chemically etched on one side with sodium ammonia etchant. At the end of the 24 hour wear test the depth of the wear groove in the film layer was 244.1 microns. The coefficient of friction at the end of the wear test was 1.231. The skived PTFE film had been completely worn through during the 24 hours.

Example 10 (25% Graphite Filled Skived PTFE/EPDM)

A moulded article was prepared using 32 grams of the EPDM compound and a 0.13 mm thick skived PTFE film with 25% graphite filler that had been etched on side with a sodium ammonia etchant. At the end of the 24 hour wear test the depth of the wear groove in the film layer was 39.6 microns. The coefficient of friction at the end of the wear test was 0.166.

The examples and comparative examples are summarized in Table 2:

TABLE 2

| | Description (film/Elastomeric body) |
|---|---|
| Example 1 | 6 wt % graphite ePTFE/Viton |
| Example 2 | 12 wt % graphite ePTFE/Viton |
| Example 3 | 24 wt % graphite ePTFE/Viton |
| Example 4 | 6 wt % graphite ePTFE/HNBR |
| Example 5 | 12 wt % graphite ePTFE/HNBR |
| Example 6 | 24 wt % graphite ePTFE/HNBR |
| Example 7 | 24 wt % graphite ePTFE/EPDM |
| Comparative Example 8 | Porex/Viton |
| Comparative Example 9 | Natural skived PTFE/EPDM |
| Example 10 | 25 wt % graphite skived PTFE/EPDM |

Physical Properties of the PTFE Film and Comparative Films

Tensile Strength Method

ASTM D638-14 Standard Test Method for Tensile Properties of Plastics was used.

Tensile strength (TS) measurements were taken using 1"×6" (2.54×15.2 cm) samples stamped out of each film. The test equipment by the company Instron, USA is set up to have a 2" (2.54 cm) gap allowing roughly 2 inches (2.54 cm) to be gripped and held in each clamp. A cross head speed of 20 inches per minute (51 cm/minute) was used. The maximum load obtained during the tensile pull and was used to calculate MTS using the following formulae (1a to 1c):

$$TS(psi) = \frac{\text{Load(lb.-f)} \times PTFE \text{ full density} - (2.18 \text{ g/cm}^3)}{\text{Thickness(in.)} \times \text{width(in.)} \times \text{sample density(g/cm}^3)} \quad (1a)$$

$$TS(\text{kg} - \text{force/cm}^2) = \quad (1b)$$
$$\frac{\text{Load(kg.-force)} \times PTFE \text{ full density} - (2.18 \text{ g/cm}^3)}{\text{Thicknesses(cm)} \times \text{width(cm)} \times \text{sample density(g/cm}^3)}$$

$$TS(\text{MPa}) = 10.197 \times TS(\text{kg/cm}^2) \quad (1c)$$

Thickness (μm)

The thickness of the PTFE films was measured using a desk mounted Heidenhain thickness gauge model SGMT 60M.

Mass/Area (g/m²)

The mass/area weights of the films were determined using a Toledo Mettler scale model AG 204.

Density (g/m²)

The density is calculated using the 1"×6" (2.54×15 cm) samples for the tensile tests. The samples are weighed and the thickness is measured. The density is calculated by dividing the mass (g) by the volume of the sample (cm³).

Elongation at Break (%)

Elongation-to break was calculated in accordance with ASTM D638-14, section 11.3.1.2; by reading the extension (change in gauge length) at the point of rupture. The gauge length at the point of rupture was divided by the original gage length and multiplied by 100.

$$\text{Elongation (\%)} = Lf - Li/Li \times 100$$

where Li=is the initial gap between the clamps and Lf=The final full distance pulled until breakage including the gap distance

Mouldability

Figure 2:
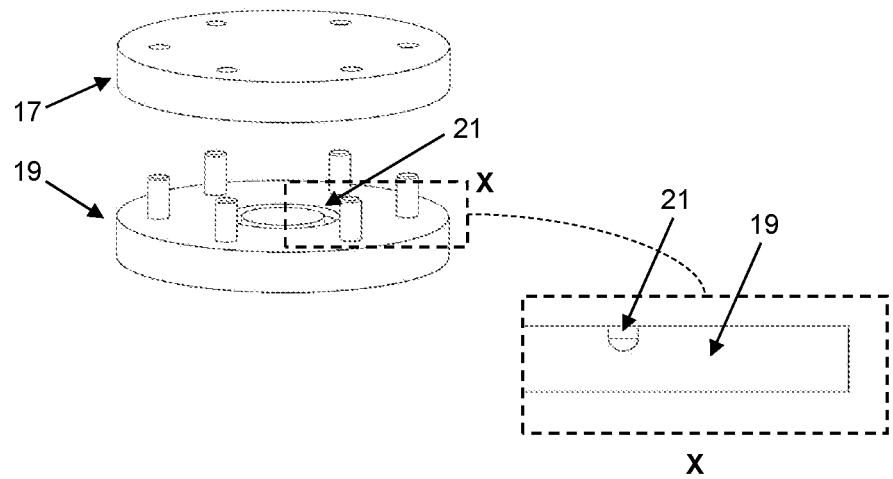
FIGS. 2 and 3 the mould used to conduct mouldability testing.
Figure 3:
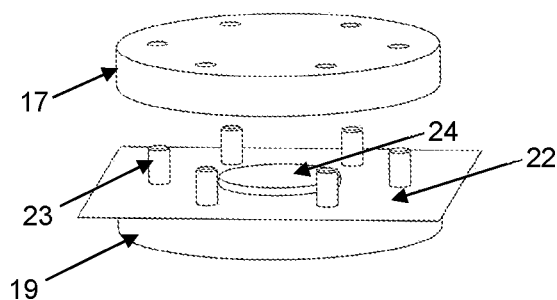

Mouldability tests were conducted using a platen press and the mould shown in FIG. 2, which comprises a heated mould top 17 and mould base 19. A cross sectional view of region X through the mould base 19 is also shown. The mould 19 has an annular channel 21, defining a mould cavity having the following dimensions:
Inner Diameter=25.4 mm (1.0")
Outer Diameter=34.93 mm (1.38")
Depth=7.16 mm (0.282") with a radius of 4.78 mm in the bottom of the cavity The mould top 17 was heated to 160° C. (320° F.). The mould base 19 was preheated before each test. The film samples were cut to approximately 114 mm in length and width. A hole pattern was cut in the film samples 22 to secure the film with the dowel pins 23 in the mould 19, as shown in FIG. 3. The hole pattern had a hole diameter of 7.94 mm (0.313 inches) on a circular centre line of 76.2 mm (3 inches) in diameter. A disk of uncured elastomeric material 24, EPDM rubber, with a thickness of about 3 mm was cut with a hole punch with a diameter of 38.1 mm.

The cut film sample was placed over the mould base 19 (passing the pins 23 through the holes in the film 22). The EPDM disk was placed on top of the test film sample and centred in the mould over the mould cavity. The mould top was placed on the mould base using the dowel pins to align the mould top with the mould base. The mould was placed on the lower platen of the hydraulic press and centred on the platen.

A press load of 89 kN (20,000 lb) was applied to the platens and held for a dwell time of 20 minutes to cure the EPDM rubber. At the end of the dwell time the press load was released and the mould was removed from the press. The mould top was removed and the moulded part was removed from the mould cavity. The moulded part was visually inspected for any tearing in the film. A pass/fail criteria was used in the evaluation. Samples that had no tearing in the film over the moulded surface (area of the mould cavity) were considered passing.

Mouldability test results are set out in Table 3.

TABLE 3

| Film | Pass/Fail |
| --- | --- |
| 24 wt % graphite ePTFE | Pass |
| 12 wt % graphite ePTFE | Pass |
| Natural skived PTFE | Pass |
| 25 wt % graphite skived PTFE | Fail |

The PTFE film has sufficient "mouldability" (i.e. the ability to form a connection with the elastomeric body) without tearing or blistering.

Wear Rate Testing and Coefficient of Friction—ASTM D3702-94 (Reapproved 2014)

(ASTM D 3702; Test Method for Wear Rate and Coefficient of Friction of Materials in Self-Lubricated Rubbing Contact using a Thrust Washer Testing Machine, American Society Testing & Materials, USA, 1978-1994, which is incorporated herein by reference).

The wear resistance and coefficient of friction properties of the moulded examples were measured using an automated tribometer (LRI-1a Automated Tribometer, Lewis Research Inc., Lewes, Delaware, USA) and following the test procedures defined in the ASTM D3702-94 (2014) test method with noted exceptions.

Figure 1:
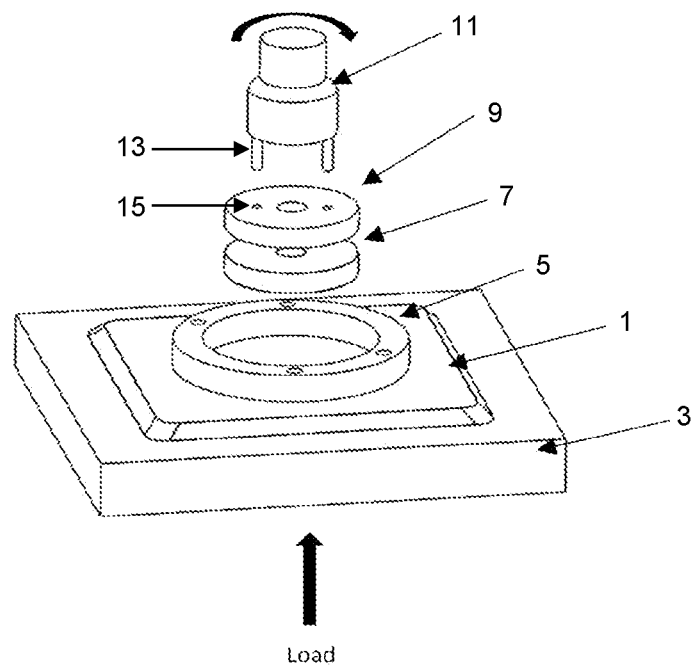
FIG. 1 shows an exploded view of wear test and coefficient of friction test apparatus.

The test set up for the wear tests can be seen in FIG. 1. A test sample 1 was placed on a test sample platform 3 and retained by a hold-down ring 5 bolted to the platform through the test sample, with dimensions of 71.5 mm by 36.5 mm (rectangular plates). A steel thrust bearing 7 is coupled to annular holder 9. The holder 9 is coupled to a rotary spindle 11, by drive pins 13, which slot into corresponding apertures 15 in the holder 9.

Figure 5:
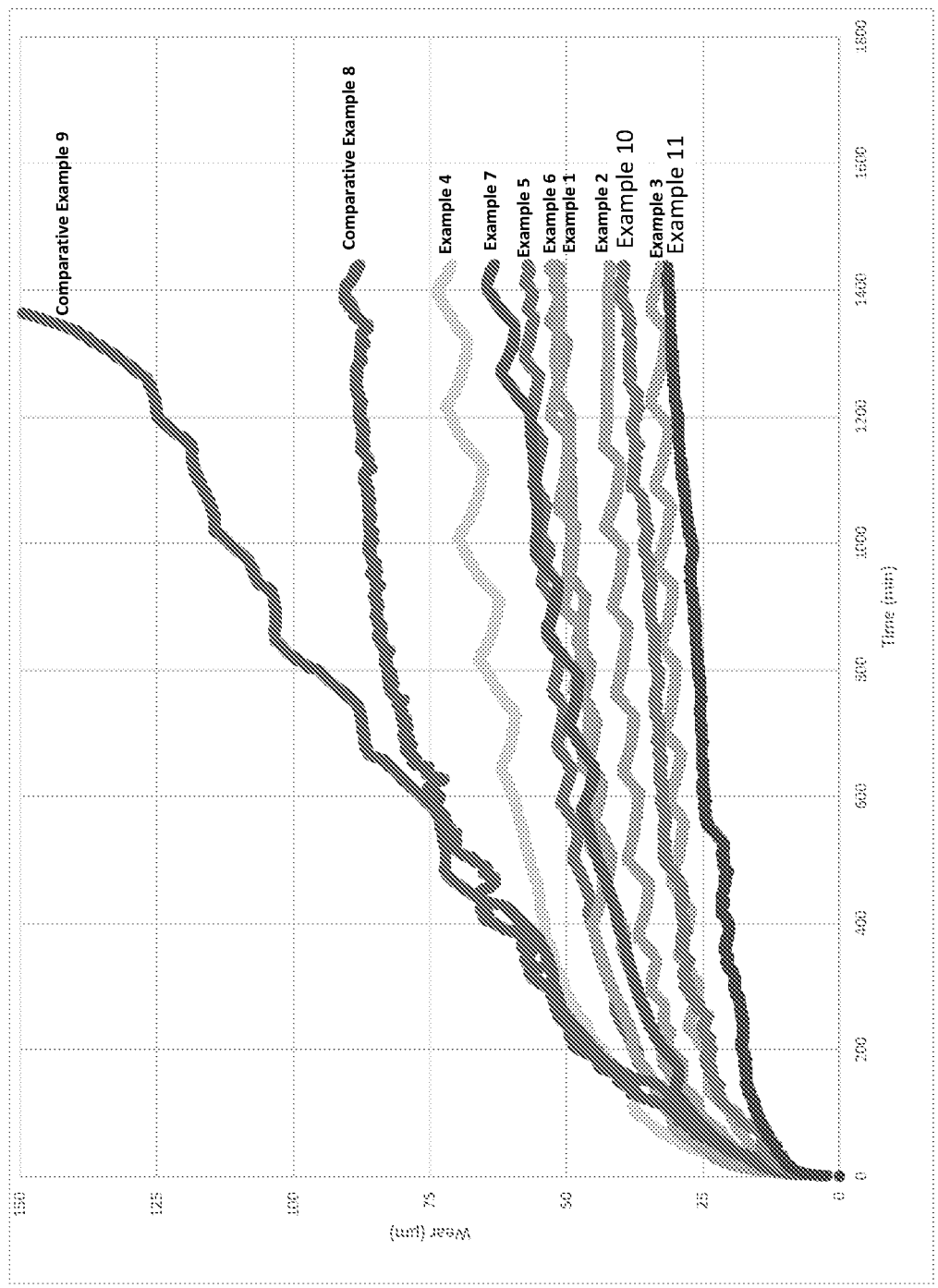
FIG. 5 shows a plot of wear vs time for examples 1-11.
Figure 6:
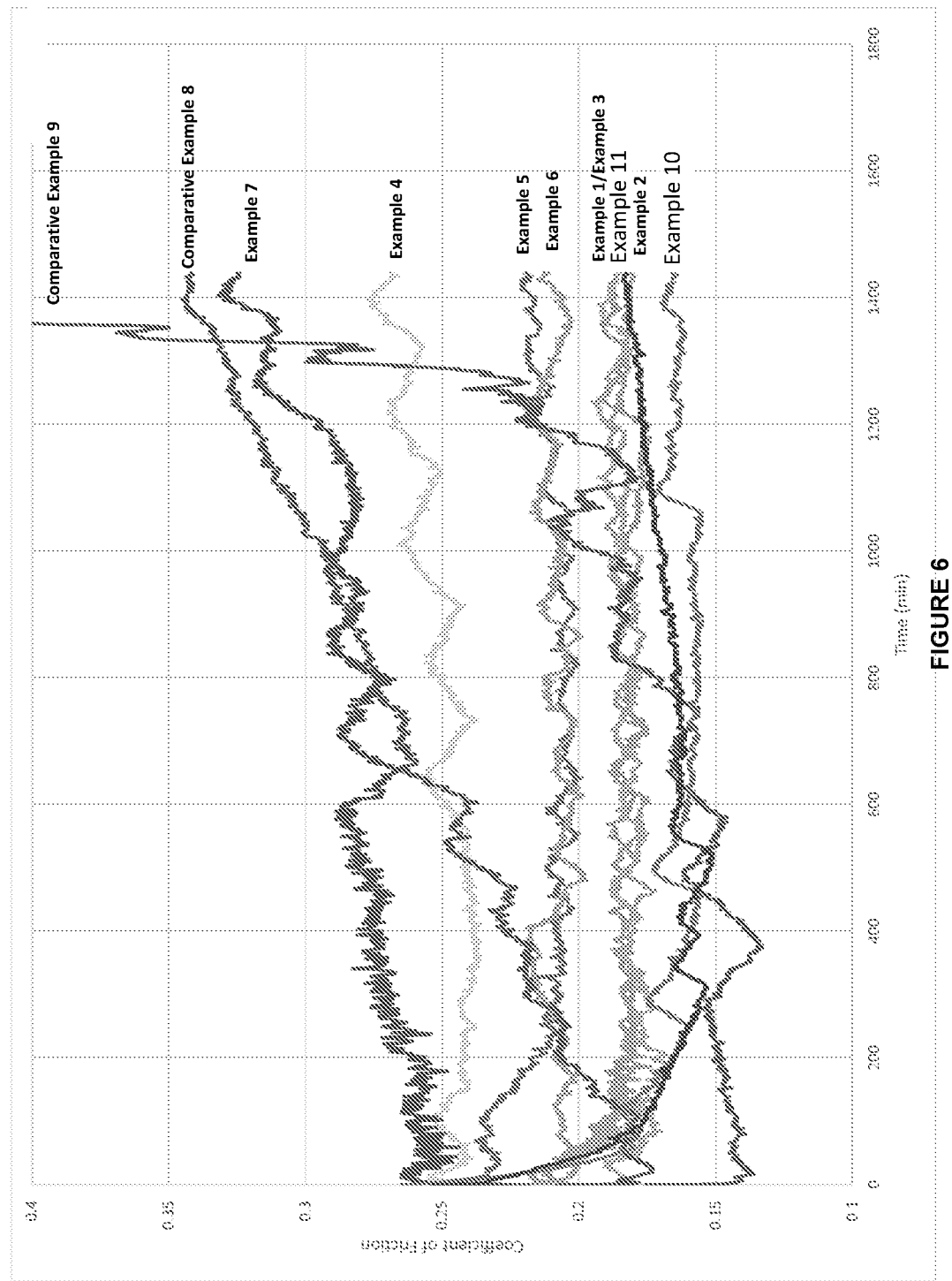
FIG. 6 shows a plot of coefficient of friction vs time for examples 1-11.

A 1018 steel ASTM D3702 thrust bearing 7 was used to wear against the PTFE film layer in the test samples. The pressure applied to the test samples was 345 kPa (50 psi) and the rotational speed of the thrust bearing was 34 rpm (10 fpm). The test duration was 24 hours. No break-in interval was used prior to determining the wear in the samples. The tests were performed under dry conditions. The wear groove depth and the coefficient of friction (CoF) were measured continuously throughout the tests. The overall wear rate was calculated by the following equation:

Overall wear rate ($\mu$m/hr)=wear groove depth at the end of the test ($\mu$m)/test duration (hr) Wear test and coefficient of friction test results are summarised in Table 4. Plots vs. time of these data are in FIGS. 5 and 6.

The stiffness of the elastomeric body has been found to have an effect on the wear performance and coefficient of friction (e.g. examples 1-3 as compared to examples 4-6). The Viton had the highest durometer at around 75 while the HNBR and EPDM had a durometer of 70.

TABLE 4

| | Overall Wear Rate ($\mu$m/hr) | Depth of the Wear Groove after 24 hr ($\mu$m) | CoF after 24 hrs |
| --- | --- | --- | --- |
| Example 1 | 3.581E−02 | 51.6 | 0.185 |
| Example 2 | 2.911E−02 | 41.9 | 0.181 |
| Example 3 | 2.258E−02 | 32.5 | 0.185 |
| Example 4 | 4.940E−02 | 71.1 | 0.268 |
| Example 5 | 3.970E−02 | 57.2 | 0.22 |
| Example 6 | 3.669E−02 | 52.8 | 0.213 |
| Example 7 | 4.393E−02 | 63.2 | 0.324 |
| Comparative Example 8 | 6.104E−02 | 87.9 | 0.342 |
| Comparative Example 9 | 1.695E−01 | 244.1 | 1.231 |
| Example 10 | 2.752E−02 | 39.6 | 0.166 |

The relationship between sealing film thickness and elastomer body stiffness is also a factor in wear resistance and CoF performance. The ePTFE sealing films became partially densified during compression moulding, reducing the film thickness from around 250-300 $\mu$m to around 75-100 $\mu$m in the final test sealing elements. This compares to a skived PTFE film thickness of ca. 150 $\mu$m.

SEM/EDS Method

Scanning electron microscopy (SEM) and energy dispersive X-ray spectroscopy (EDS) were used to analyze the distribution of the graphite particles in the ePTFE film in the inventive examples. A Hitachi High-Resolution scanning electron microscope with EDS detector, ModelSU8230, was used. An accelerating voltage of 2 to 5 kV was used for imaging and 10 kV was used for EDS analysis. A working distance of at least 15 mm between the detector and the sample was required for the EDS detector. Samples were prepared by slicing a section from the molded samples with a carbon steel blade to have a cross sectional view of the elastomeric body and the PTFE film. Samples were also prepared having a top down view of the top surface of the PTFE film in the molded samples. The samples were mounted to an SEM sample stub using a carbon adhesive tape. The samples were coated with approximately 2.5 nm of platinum to reduce charging.

The thickness of the PTFE film was measured in the SEM images at multiple locations.

The results are summarized in table 5.

EDS was used to identify the lubricious particles (graphite) in the PTFE film of the inventive examples and to calculate the amount of graphite by measuring the amount of carbon and fluorine on an atomic percentage basis. A 500× magnification was used for the EDS scans. EDS scans were performed on the top surface of the PTFE film and through the thickness of the PTFE film.

A carbon to fluorine ratio (C:F) was calculated from the measured percentages of carbon aid fluorine atoms. Pure PTFE has a carbon to fluorine ratio of 1:2, or 0.5, since there is one carbon atom for every two fluorine atoms in PTFE.

The amount of graphite in the EDS scan area can be estimated from the following equation:

$$\% \text{ graphite} = (0.67 \times C{:}F - 0.33)/(0.67 + 0.67 \times C{:}F) \times 100\%$$

Where C:F is the carbon to fluorine ratio from the EDS analysis

Results of the EDS analysis are summarized in table 6 and 7.

TABLE 5 summarizes the thickness measurement based on the SEM images shown in FIGS. 7 to 10.

TABLE 5

Thickness Measurements from SEM

|  | Example 1 | Example 2 | Example 3 | Example 4 | Example 5 | Example 6 | Example 7 | Comparative Example 8 | Comparative Example 9 | Example 10 |
|---|---|---|---|---|---|---|---|---|---|---|
|  | 43 | 64 | 45 | 65 | 44 | 56 | 68 | 79 | 96 | 140 |
|  | 43 | 61 | 60 | 41 | 40 | 68 | 59 | 68 | 98 | 140 |
|  | 39 | 74 | 53 | 70 | 39 | 63 | 55 | 78 | 95 | 130 |
|  | 46 | 64 | 53 | 53 | 38 | 49 | 57 | 84 | 97 | 140 |
|  | 52 | 80 | 53 | 59 | 38 | 55 | 53 | 81 | 98 | 140 |
|  | 51 | 66 | 60 | 49 | 39 | 51 | 68 | 83 | 97 | 140 |
|  | 43 | 94 | 70 | 62 | 39 | 80 | 66 | 80 | 96 | 130 |
|  | 44 | 67 | 54 | 63 | 48 | 83 | 83 | 78 | 96 | 130 |
|  | 47 | 73 | 60 | 57 | 44 | 94 | 88 | 79 | 93 | 140 |
|  | 45 | 52 | 48 | 62 | 38 | 88 | 86 | 77 | 96 | 140 |
|  | 46 | 59 | 68 | 60 | 30 | 88 | 97 | 78 | 97 | 140 |
|  | 42 | 62 | 67 | 53 | 36 | 64 | 81 | 80 | 95 | 140 |
|  | 53 | 46 | 49 |  |  | 57 |  |  |  |  |
|  | 55 | 55 | 55 |  |  | 48 |  |  |  |  |
|  | 51 | 51 | 53 |  |  | 56 |  |  |  |  |
| Average (μm) | 47 | 65 | 57 | 58 | 39 | 67 | 73 | 79 | 96 | 138 |
| STD | 4.7 | 12.3 | 7.5 | 7.8 | 4.5 | 15.8 | 16.3 | 3.98 | 1.4 | 4.5 |
| Max | 55 | 94 | 70 | 70 | 48 | 94 | 98 | 84 | 98 | 140 |
| Min | 39 | 46 | 45 | 41 | 30 | 48 | 53 | 68 | 93 | 130 |

Table 6 lists the C:F ratios and percent graphite from the EDS analysis as measured in the cross sections, examples of which are shown in FIG. 7-10.

TABLE 6

|  | Atomic % | | C:F Ratio | % Graphite (atomic %) | Graphite wt % |
|---|---|---|---|---|---|
|  | Carbon | Flourine | | | |
| Example 1 | 36.08 | 63.92 | 0.56 | 4.32 | 3.15 |
|  | 43.17 | 56.41 | 0.77 | 15.68 | 11.84 |
| Average: | 39.63 | 60.17 | 0.67 | 10.00 | 7.50 |
| Example 2 | 51.07 | 48.1 | 0.94 | 23.07 | 18.14 |
|  | 49.09 | 50.26 | 1.00 | 25.37 | 19.73 |
|  | 48.77 | 50.57 | 0.96 | 23.85 | 18.52 |
| Average: | 49.64 | 49.64 | 0.97 | 24.10 | 18.80 |
| Example 3 | 53.37 | 46.63 | 1.14 | 30.26 | 23.80 |
|  | 51.68 | 47.91 | 1.08 | 28.24 | 22.16 |
|  | 52.29 | 47.35 | 1.1 | 28.93 | 22.74 |
| Average: | 52.45 | 47.30 | 1.11 | 29.14 | 22.90 |
| Example 6 | 53.37 | 46.63 | 1.14 | 30.26 | 23.80 |
|  | 56.48 | 42.89 | 1.32 | 35.67 | 28.69 |
|  | 54.36 | 49.71 | 1.22 | 32.77 | 24.64 |
| Average: | 54.74 | 46.41 | 1.23 | 32.90 | 25.71 |
| Example 10 | 53.37 | 46.63 | 1.14 | 30.26 | 23.80 |
|  | 62.88 | 35.67 | 1.76 | 45.92 | 38.50 |
|  | 63.32 | 35.33 | 1.79 | 46.50 | 39.01 |
| Average: | 59.86 | 39.21 | 1.56 | 40.89 | 33.77 |

Table 7 lists the C:F ratios and percent graphite from the EDS analysis as measured in the top surface, examples of which are shown in FIG. 7-10. Table 8 shows a summary of the D:F ratios set out in tables 6 and 7, together with a ratio of top:cross section C:F ratios.

TABLE 7

|  | Atomic % | | C:F Ratio | % Graphite (Atomic %) | Graphite wt % |
|---|---|---|---|---|---|
|  | Carbon | Fluorine | | | |
| Example 1 | 35.08 | 64.92 | 0.54 | 3.08 | 2.24 |
|  | 34.65 | 65.35 | 0.53 | 2.45 | 1.77 |
| Average: | 34.87 | 65.14 | 0.54 | 2.77 | 2.01 |
| Example 2 | 36.07 | 63.52 | 0.56 | 4.32 | 3.17 |
|  | 35.61 | 63.86 | 0.56 | 4.32 | 3.17 |

TABLE 7-continued

|  | Atomic % | | C:F Ratio | % Graphite (Atomic %) | Graphite wt % |
|---|---|---|---|---|---|
|  | Carbon | Fluorine | | | |
| Average: | 35.84 | 63.69 | 0.56 | 4.32 | 3.17 |
| Example 3 | 40.24 | 59.76 | 0.67 | 10.63 | 7.89 |
|  | 39.9 | 59.73 | 0.67 | 10.63 | 7.91 |
| Average: | 40.07 | 59.75 | 0.67 | 10.63 | 7.90 |
| Example 6 | 39.79 | 59.49 | 0.67 | 10.63 | 7.94 |
|  | 40.81 | 58.54 | 0.67 | 10.63 | 7.97 |
| Average: | 40.30 | 59.02 | 0.67 | 10.63 | 7.95 |
| Example 10 | 80.83 | 12.06 | 6.70 | 80.62 | 80.70 |
|  | 81.37 | 12.59 | 6.46 | 79.99 | 78.98 |
|  | 86.52 | 7.33 | 11.80 | 88.34 | 90.04 |
| Average: | 82.91 | 10.66 | 8.32 | 82.98 | 83.24 |

The equation for calculating the wt % of graphite based on the atomic % is:

Wt % graphite=[Atomic % Graphite*12.011]/
 [(Atomic % Carbon*12.011)+(Atomic % Fluorine*18.998)]

TABLE 8

|  | Top Surface C:F Ratio | Bottom Surface C:F Ratio | Top Surface: Bottom Surface |
|---|---|---|---|
| Example 1 | 0.54 | 0.67 | 0.80 |
| Example 2 | 0.56 | 0.97 | 0.58 |
| Example 3 | 0.67 | 1.11 | 0.61 |
| Example 6 | 0.67 | 1.23 | 0.55 |
| Example 10 | 8.32 | 1.56 | 5.32 |

The inventors surprisingly found through the EDS analysis that there was less graphite visible on the top surface of the of the PTFE film than throughout the thickness of the film in the samples made with graphite filled expanded PTFE film. This means that the examples made with the graphite filled expanded PTFE have a PTFE rich top surface.

Thermogravimetric Analysis

Thermogravimetric Analysis is a method which can be used to determine the weight percentage of the lubricious particulate material in the PTFE film using a thermogravimetric analyzer. In the TGA method, a sample of the PTFE film ranging in weight of 2.5 to 5 mg is heated at a uniform rate under a nitrogen atmosphere. The nitrogen, or other inert gas, atmosphere is used to prevent oxidation of the particulate material. The thermogravimetric analyzer records the change in weight of the sample over time or temperature. The PTFE component in the film thermally degrades through a temperature range of 450° C. to 625° C. Above 625° C. the PTFE component has fully decomposed. The residual weight of the sample after the PTFE component has decomposed can be attributed to the lubricious particulate material. For example, where the lubricious particulate material in the PTFE film is graphite, graphite is thermally stable above 700° C., therefore the residual weight of the film sample in the TGA curve at 700° C. can be attributed to the graphite content in the film. For materials that thermally decompose at temperatures below that of PTFE, the changes in weight in the TGA curve can be used to determine the amount of particulate material in the PTFE film, as well.

Initial Porosity and Final Porosity Calculations

The theoretical maximum density of each of the graphite filled ePTFE films was calculated from the following equation:

Density=% graphite×graphite density+% PTFE×PTFE density

The density of the graphite powder was provided by the supplier and had a value of 2.7 g/cm³.
The density of PTFE used in the calculation was 2.25 g/cm³.
The film density from Table 1 was used to estimate the initial porosity in the graphite filled ePTFE membranes using the following equation:

% Porosity=film density/Theoretical maximum density×100

The results of the initial porosity estimations are shown in Table 9.

TABLE 9

| Graphite Content (%) | Theoretical Density of filled PTFE (g/cm³) | Film Density (g/cm³) | Initial Porosity (%) |
| --- | --- | --- | --- |
| 6% | 2.277 | 0.453 | 80% |
| 12% | 2.304 | 0.416 | 82% |
| 24% | 2.358 | 0.407 | 83% |

The residual porosity in the compressed ePTFE films in the inventive examples was calculated from the following equation:

% Residual porosity=Initial Porosity (%)×[Compressed Film Thickness/Initial Film Thickness]

The results are shown in the Table 10.

TABLE 10

| | Initial Film Thickness (µm) | Initial Porosity (%) | Compressed Film Thickness (µm) | Final Porosity (%) |
| --- | --- | --- | --- | --- |
| Example 1 | 320.0 | 80% | 46.7 | 12% |
| Example 2 | 260.2 | 82% | 65 | 20% |
| Example 3 | 243.8 | 82% | 57 | 19% |

TABLE 10-continued

| | Initial Film Thickness (µm) | Initial Porosity (%) | Compressed Film Thickness (µm) | Final Porosity (%) |
| --- | --- | --- | --- | --- |
| Example 4 | 320.0 | 80% | 58 | 15% |
| Example 5 | 269.2 | 82% | 39 | 12% |
| Example 6 | 243.8 | 82% | 67 | 22% |
| Example 7 | 243.8 | 82% | 73 | 25% |

Figure 7A:
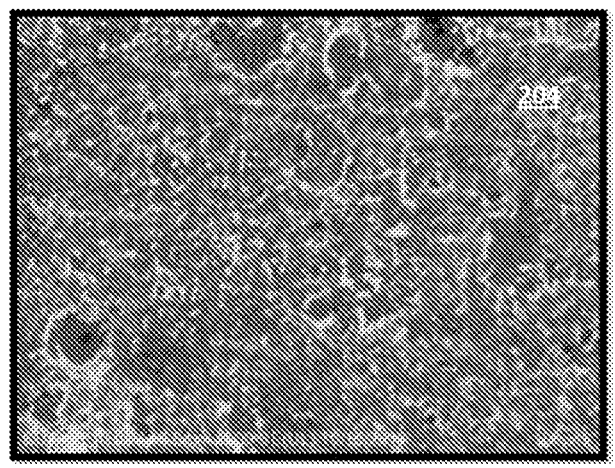
FIG. 7 shows (a) an SEM image and (b) an EDS image of a portion of the sealing surface of the moulded article of example 1 (viewed from above) and; (c) an SEM image and (d) an EDS image of a cross section taken through the moulded article of example 1 (viewed from normal to the sealing surface).
Figure 7B:
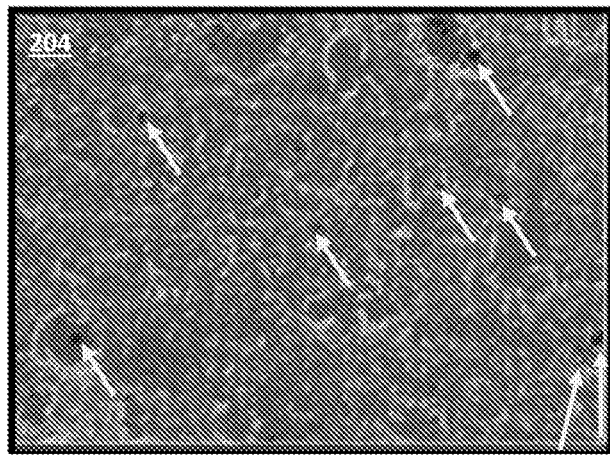
Figure 7C:
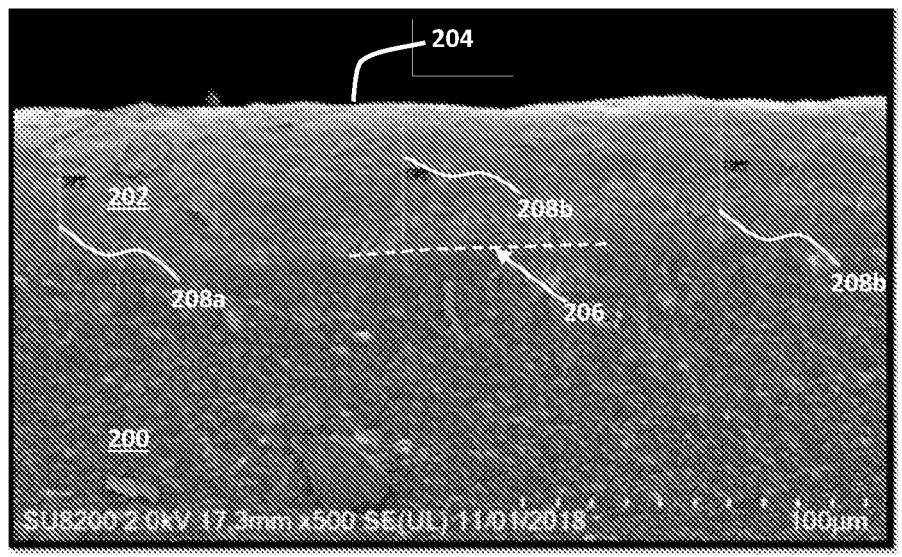
Figure 7D:
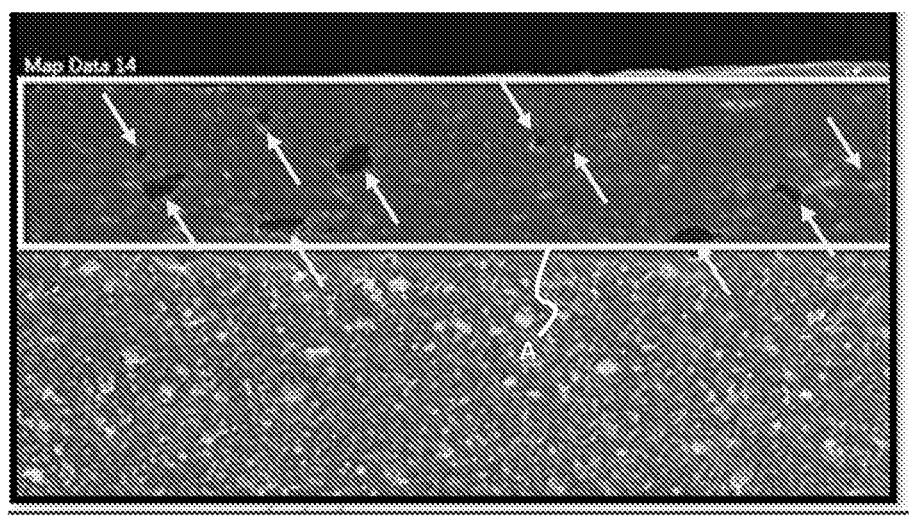

Referring now to the EDS images in FIGS. 7(b) and 7(d), the red (in the original images) spots indicate the presence of a graphite particle. Selections of the larger of the particles visible are highlighted by the arrows in the figures.

The C:F ratio values of table 6 are based upon the portion of the image within box A.

Referring now to the cross sectional SEM image in FIG. 7(c), the material of the elastomeric body 200 and of the sintered PTFE film 202 can be seen. The film 202 has a sealing surface 204 and is coupled to the elastomeric body 200 at a boundary 206 (a portion of which is highlighted by the dotted line), wherein elastomer penetrates the pores of the ePTFE film 202. The penetrated region at the boundary is less than 5 microns thick and not visible in the scale of the SEM images shown.

Figure 8A:
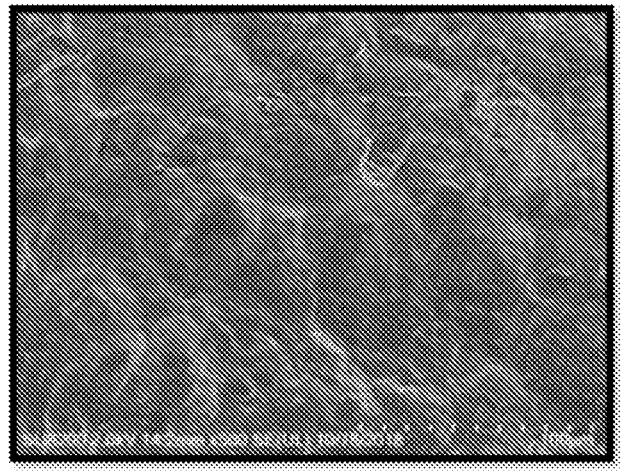
FIG. 8 shows (a) an SEM image and (b) an EDS image of a portion of the sealing surface of the moulded article of example 2 (viewed from above) and; (c) an SEM image and (d) an EDS image of a cross section taken through the moulded article of example 2 (viewed from normal to the sealing surface).
Figure 8B:
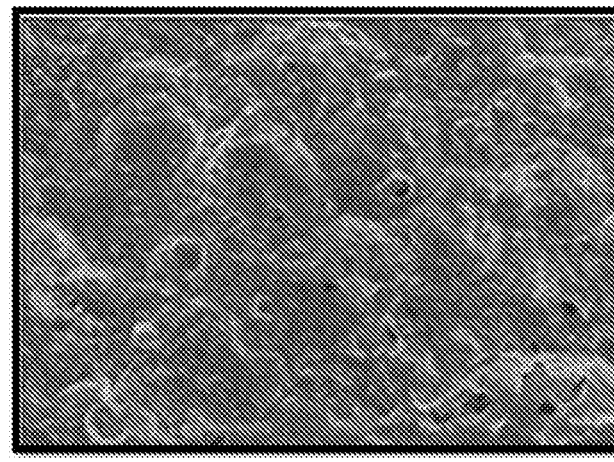
Figure 8C:
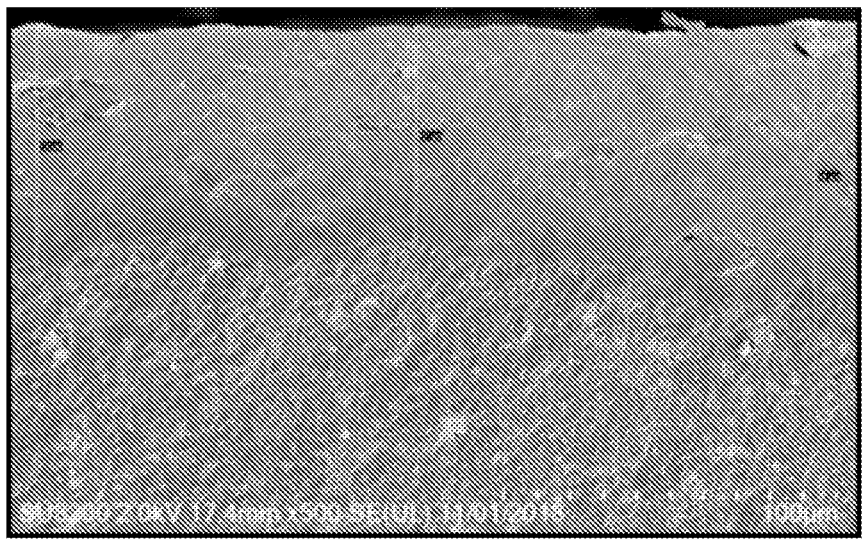
Figure 8D:
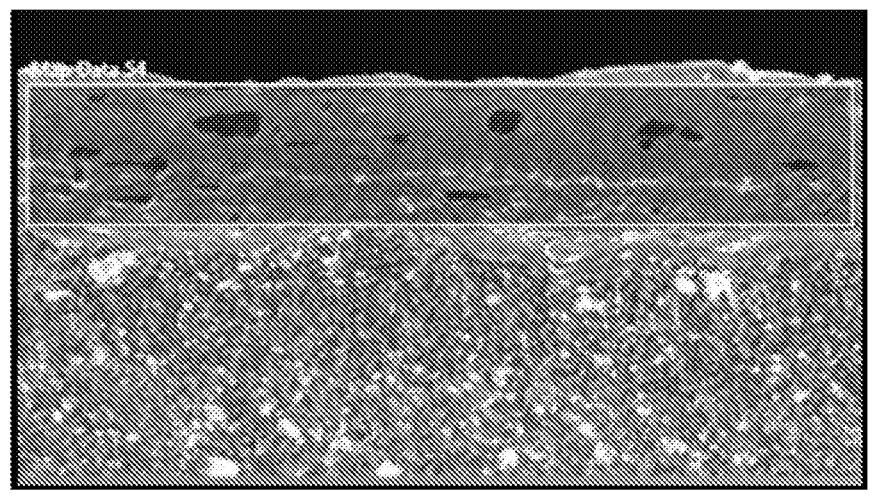
Figure 9A:
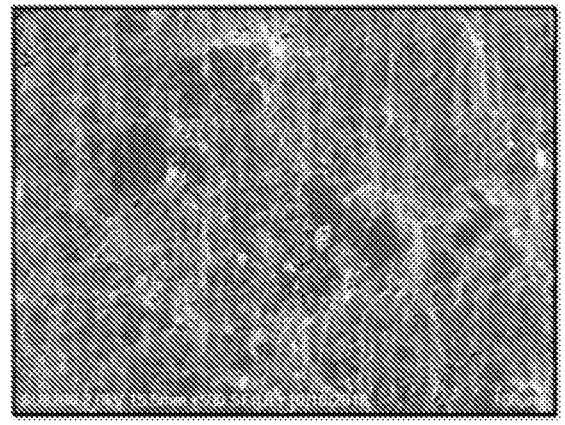
FIG. 9 shows (a) an SEM image and (b) an EDS image of a portion of the sealing surface of the moulded article of example 3 (viewed from above) and; (c) an SEM image and (d) an EDS image of a cross section taken through the moulded article of example 3 (viewed from normal to the sealing surface).
Figure 9B:
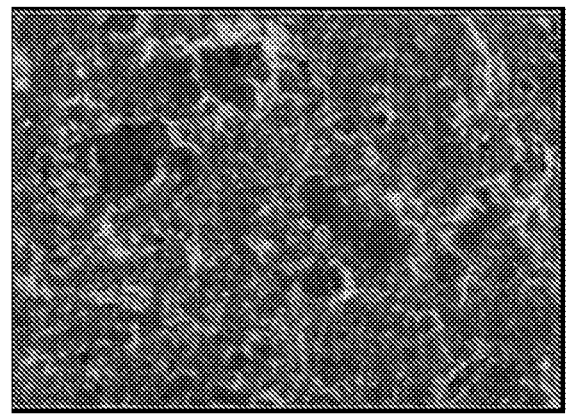
Figure 9C:
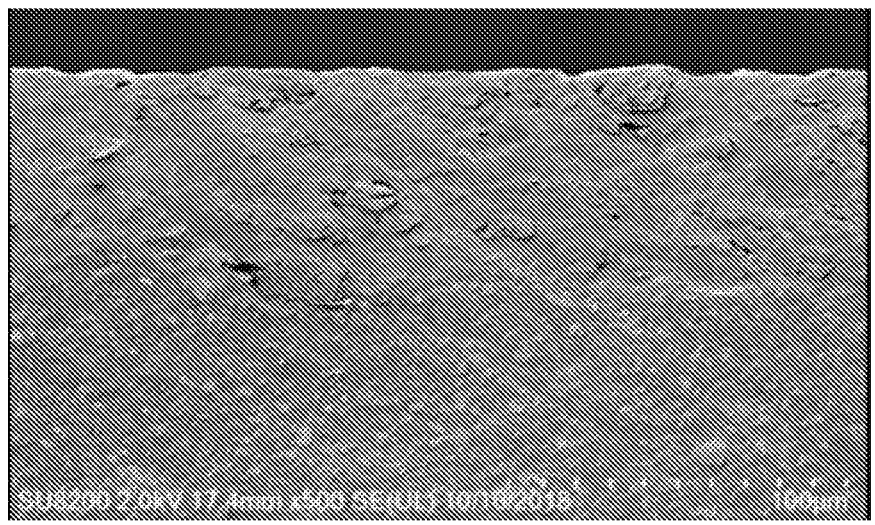
Figure 9D:
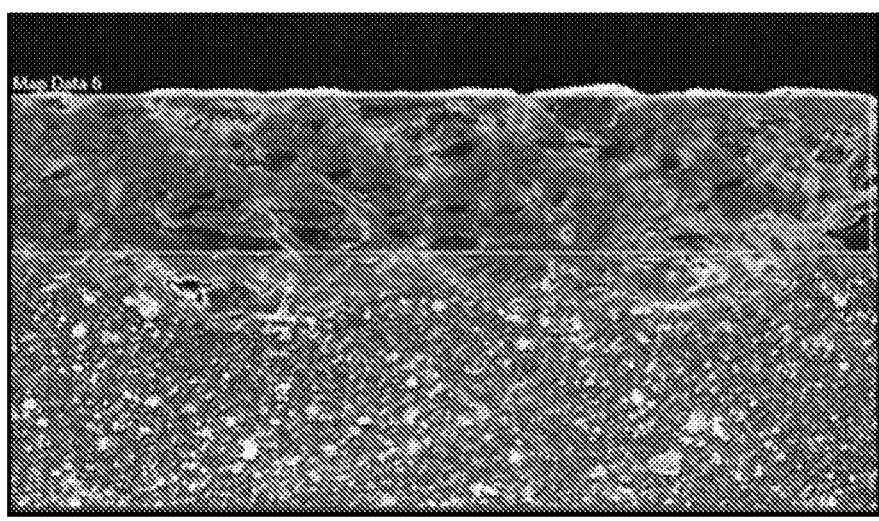
Figure 10A:
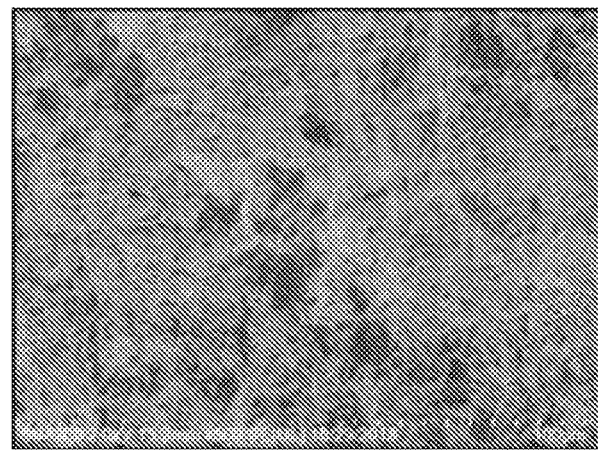
FIG. 10 shows (a) an SEM image and (b) an EDS image of a portion of the sealing surface of the moulded article of example 6 (viewed from above) and; (c) an SEM image and (d) an EDS image of a cross section taken through the moulded article of example 6 (viewed from normal to the sealing surface).
Figure 10B:
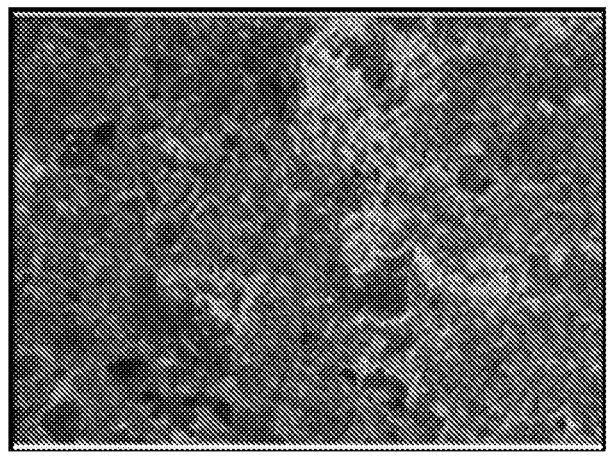
Figure 10C:
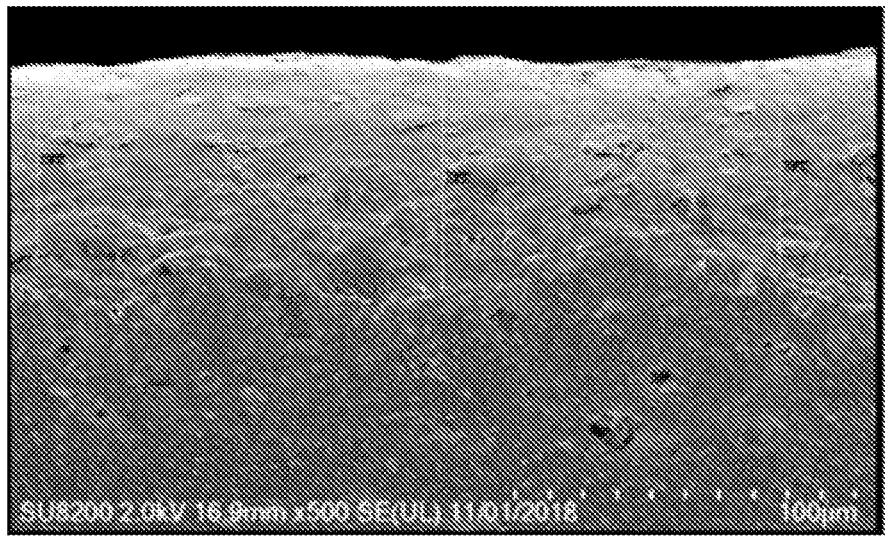
Figure 10D:
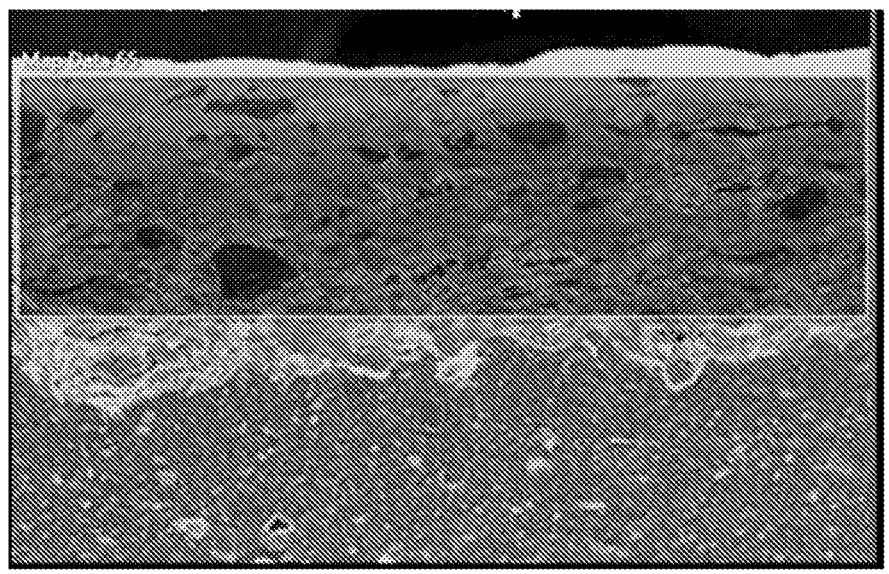

Some variation in the overall thickness of the sintered PTFE film 202 defining the sealing layer 204 can be seen in the image to vary (thicknesses 208a, b and c), which is even more pronounced in relation to other samples (see FIGS. 8(c) and 10(c) in particular), and such variations vary with moulding conditions (elastomer viscosity, pressure and the like).

The corresponding features observable in FIGS. 7(a)-(d) can also be seen in FIGS. 8-10.

The invention claimed is:
1. A sealing element having a sealing surface for providing a seal against a contact surface, the sealing element comprising:
an elastomeric body comprising an elastomeric material; and
a sintered polytetrafluoroethylene (PTFE) film coupled to the elastomeric body, and defining the sealing surface;
the film having a thickness between 25 microns and 200 microns, and the film comprising between 5 wt % and 40 wt % of a lubricious particulate material.
2. The sealing element of claim 1, wherein the sintered PTFE film comprises a skived PTFE film, a cast PTFE film, an extruded PTFE film or an expanded PTFE (ePTFE) film.
3. The sealing element of claim 2, wherein the sintered PTFE film is a biaxially expanded ePTFE film.
4. The sealing element of claim 1, wherein the sintered PTFE film comprises an expanded PTFE film, and wherein the sintered ePTFE film comprises a penetrated region adjacent to the elastomeric body in which elastomeric material is present in pores of the sintered ePTFE film and an unpenetrated region adjacent to the sealing surface.
5. The sealing element of claim 1, wherein the sealing element comprises a multilayer laminate, the multilayer laminate comprising the sintered PTFE film defining the sealing surface and at least one intermediate layer.
6. The sealing element of claim 5, wherein the multilayer laminate comprises the sintered PTFE layer defining the sealing surface and at least one intermediate PTFE layer.
7. The sealing element of claim 6, wherein the multilayer laminate comprises a porous PTFE intermediate layer adjacent to the elastomeric body.

8. The sealing element of claim 5, wherein the multilayer laminate comprises at least one intermediate thermoplastic layer.

9. The sealing element of claim 5, wherein the thickness of the sintered PTFE film defining the sealing surface and each intermediate film layer together are between 30 and 250 microns.

10. The sealing element of claim 1, wherein the sintered PTFE film comprises an expanded PTFE film, and wherein the sintered ePTFE film defining the sealing surface is at least partially densified.

11. The sealing element of claim 1, wherein the elastomeric body comprises one or more elastomeric materials selected from; natural rubbers (polyisoprenes), butadienes, ethylene propylenes (EPR, or EPM), ethylene propylene dienes (EPDR, or EPDM), styrene-butadienes (SBR), isobutenes, urethanes, acrylics or nitriles (acrylonitrile-butadienes, i.e., ABR), halogenated nitriles, chloroelastomers such as chloroprenes, perfluoroelastomers, fluoroelastomers, silicones, fluorosilicones, epichlorohydrin rubbers, polyether block amides (PEBA), chlorosulfonated polyethylenes (CSM), ethylene-vinyl acetates (EVA).

12. The sealing element of claim 1, wherein the lubricious particulate material is provided in the form of a powder or in microfibrous form, or wherein the lubricious particulate material comprises micro-particles, or nano-particles.

13. The sealing element of claim 1, wherein the lubricious particulate material comprises or consists of a carbon-based component.

14. The sealing element of claim 13, wherein the lubricious particulate material consists essentially of graphite.

15. The sealing element of claim 13, wherein the ratio of the Carbon (C):Fluorine (F) ratio (C:F) as measured normal to the sealing surface of the sintered PTFE film to the C:F ratio as measured normal to the thickness of the sintered PTFE film is less than or equal to 0.8.

16. A sintered ePTFE film for use in the manufacture of a sealing element, the ePTFE film comprising between 5 wt % and 40 wt % of a lubricious particulate material and having a thickness between 25 microns and 700 microns, the ePTFE film being uniaxially or biaxially expanded.

17. The ePTFE film of claim 16, wherein the ePTFE film is biaxially expanded.

18. The ePTFE film of claim 16, wherein the lubricious particulate material consists essentially of graphite; or a mixture of graphite and one or more particulate carbon-based components.

19. A method of manufacturing a sealing element having an elastomeric body and a sealing surface for providing a seal against a contact surface, the method comprising:
providing a sintered PTFE film, the sintered PTFE film comprising between 5 wt % and 40 wt % of a lubricious particulate material; or a multilayer laminate comprising the sintered PTFE film and at least one further film layer;
placing the sintered PTFE film or multilayer laminate over at least a part of a surface of a mould cavity; and
introducing an elastomeric material into the mould cavity to overmould the sintered PTFE film or multilayer laminate and form a sealing element, wherein the sintered PTFE film or multilayer laminate is coupled to the elastomeric body, has a thickness of between 25 and 200 microns and wherein the sintered PTFE film defines the sealing surface.

20. The method of claim 19, wherein the sintered PTFE film or multilayer laminate is gas permeable.

* * * * *